(12) United States Patent
Okamoto et al.

(10) Patent No.: US 10,669,419 B2
(45) Date of Patent: Jun. 2, 2020

(54) CURABLE RESIN COMPOSITION, STRUCTURAL ADHESIVE, COATING MATERIAL OR FIBER REINFORCED COMPOSITE MATERIAL USING THE SAME, FOAM BODY USING THE SAME, LAMINATE USING THE SAME, AND CURED MATERIAL THEREOF

(71) Applicant: KANEKA CORPORATION, Osaka (JP)

(72) Inventors: Toshihiko Okamoto, Takasago (JP); Shohei Nishimori, Takasago (JP)

(73) Assignee: KANEKA CORPORATION, Osaka (JP)

( * ) Notice: Subject to any disclaimer, the term of this patent is extended or adjusted under 35 U.S.C. 154(b) by 0 days.

(21) Appl. No.: 16/117,866

(22) Filed: Aug. 30, 2018

(65) Prior Publication Data

US 2018/0371239 A1    Dec. 27, 2018

Related U.S. Application Data

(62) Division of application No. 14/896,295, filed as application No. PCT/JP2014/064998 on Jun. 5, 2014, now Pat. No. 10,100,195.

(30) Foreign Application Priority Data

Jun. 7, 2013 (JP) .................. 2013-120388

(51) Int. Cl.
| | |
|---|---|
| *C08L 75/04* | (2006.01) |
| *C08G 18/75* | (2006.01) |
| *C08J 9/00* | (2006.01) |
| *C08J 9/02* | (2006.01) |
| *C08G 18/48* | (2006.01) |
| *C08G 18/76* | (2006.01) |
| *C08G 18/24* | (2006.01) |
| *C08G 18/42* | (2006.01) |
| *C08J 5/24* | (2006.01) |
| *C09D 175/04* | (2006.01) |
| *C09J 175/04* | (2006.01) |
| *C08J 5/04* | (2006.01) |
| *C09D 7/65* | (2018.01) |
| *C09J 11/08* | (2006.01) |
| *C08G 101/00* | (2006.01) |

(52) U.S. Cl.
CPC ............ *C08L 75/04* (2013.01); *C08G 18/244* (2013.01); *C08G 18/42* (2013.01); *C08G 18/4825* (2013.01); *C08G 18/4829* (2013.01); *C08G 18/755* (2013.01); *C08G 18/7664* (2013.01); *C08J 5/04* (2013.01); *C08J 5/24* (2013.01); *C08J 9/0061* (2013.01); *C08J 9/02* (2013.01); *C09D 7/65* (2018.01); *C09D 175/04* (2013.01); *C09J 11/08* (2013.01); *C09J 175/04* (2013.01); *C08G 2101/0008* (2013.01); *C08G 2101/0083* (2013.01); *C08G 2350/00* (2013.01); *C08J 2201/022* (2013.01); *C08J 2205/10* (2013.01); *C08J 2375/04* (2013.01); *C08J 2409/00* (2013.01); *C08J 2413/00* (2013.01); *C08J 2419/00* (2013.01); *C08J 2425/02* (2013.01); *C08J 2433/04* (2013.01); *C08J 2433/18* (2013.01); *C08J 2451/04* (2013.01)

(58) Field of Classification Search
CPC . C08L 75/04; C08J 2451/04; C09J 175/04–10
See application file for complete search history.

(56) References Cited

U.S. PATENT DOCUMENTS

| | | | |
|---|---|---|---|
| 4,251,428 A | 2/1981 | Recker et al. | |
| 5,401,785 A | 3/1995 | Kumagai et al. | |
| 6,159,405 A | 12/2000 | Taylor | |
| 2002/0045690 A1 | 4/2002 | Cheolas et al. | |
| 2003/0134085 A1 | 7/2003 | Haas et al. | |
| 2003/0212192 A1* | 11/2003 | Yuan | C09D 167/00 524/502 |
| 2004/0094859 A1 | 5/2004 | Cheolas et al. | |
| 2004/0143034 A1* | 7/2004 | Primke | B29B 9/10 523/176 |
| 2006/0173128 A1 | 8/2006 | Connolly | |
| 2007/0027263 A1 | 2/2007 | Furukawa et al. | |
| 2007/0098997 A1 | 5/2007 | Younes et al. | |
| 2007/0210476 A1 | 9/2007 | Sasatani et al. | |

(Continued)

FOREIGN PATENT DOCUMENTS

| | | |
|---|---|---|
| JP | 55-157620 A | 12/1980 |
| JP | 11-349916 A | 12/1999 |

(Continued)

OTHER PUBLICATIONS

Machine Translation of JP 2011190286 (Year: 2019).*

(Continued)

*Primary Examiner* — Michael M Dollinger

(74) *Attorney, Agent, or Firm* — Westerman, Hattori, Daniels & Adrian, LLP

(57) ABSTRACT

The present invention relates to a curable resin composition comprising a polyol (A) having an average hydroxyl value of 200 to 1500 mg KOH/g, a polyisocyanate (B), and polymer fine particles (C), and a curable resin composition comprising a polyol (A), a polyisocyanate (B), and polymer fine particles (C), wherein the polyol (A) comprises a polyester polyol (a2) as an essential component, and the amount of the polyester polyol (a2) is not less than 20 parts by mass per 100 parts by mass of the polyol (A).

14 Claims, No Drawings

(56) References Cited

U.S. PATENT DOCUMENTS

| | | | |
|---|---|---|---|
| 2008/0020194 A1 | 1/2008 | Younes et al. | |
| 2008/0085975 A1 | 4/2008 | Saegusa et al. | |
| 2009/0209671 A1 | 8/2009 | Emge et al. | |
| 2009/0214873 A1 | 8/2009 | Demmig | |
| 2009/0234038 A1 | 9/2009 | Wada et al. | |
| 2009/0264558 A1 | 10/2009 | Kramer et al. | |
| 2010/0087593 A1* | 4/2010 | Nakamura | C08G 18/10 524/590 |
| 2010/0130674 A1* | 5/2010 | Burckhardt | C08G 18/10 524/589 |
| 2010/0222507 A1 | 9/2010 | Nakada et al. | |
| 2010/0291368 A1* | 11/2010 | Burckhardt | C08G 18/12 428/221 |
| 2011/0046251 A1 | 2/2011 | Wada et al. | |
| 2012/0123043 A1* | 5/2012 | Nakamura | C08H 6/00 524/507 |
| 2012/0159785 A1 | 6/2012 | Pyles et al. | |
| 2012/0245286 A1 | 9/2012 | Younes | |
| 2013/0274358 A1 | 10/2013 | Yabuno et al. | |
| 2014/0113983 A1* | 4/2014 | Czaplicki | C08G 59/4021 521/92 |
| 2014/0203024 A1 | 7/2014 | Demmig | |
| 2015/0144835 A1 | 5/2015 | Kosugi et al. | |
| 2016/0122539 A1 | 5/2016 | Okamoto et al. | |

FOREIGN PATENT DOCUMENTS

| | | |
|---|---|---|
| JP | 2002-530445 A | 9/2002 |
| JP | 2003-155389 A | 5/2003 |
| JP | 2003-220661 A | 8/2003 |
| JP | 2005-272647 A | 10/2005 |
| JP | 2006-143759 A | 6/2006 |
| JP | 2007-125889 A | 5/2007 |
| JP | 2008-530294 A | 8/2008 |
| JP | 2009-108278 A | 5/2009 |
| JP | 2010-116429 A | 5/2010 |
| JP | 2010-270198 A | 12/2010 |
| JP | 2011-190286 A | 9/2011 |
| JP | 2012-251053 A | 12/2012 |
| JP | 2013-504007 A | 2/2013 |
| JP | 2013-64150 A | 4/2013 |
| JP | 2014-83904 A | 5/2014 |
| WO | 2005/028546 A1 | 3/2005 |
| WO | 2006/070664 A1 | 7/2006 |
| WO | 2009/014037 A1 | 1/2009 |
| WO | 2012/077688 A1 | 6/2012 |
| WO | 2014/196607 A1 | 12/2014 |

OTHER PUBLICATIONS

Okazaki et al, "Effects of Blend Ratio of Chain Extender on Friction and Abrasion Characteristics of Polyurethanes", Journal of the Society of Rubber Industry, 1995, vol. 68, pp. 417-426, with Partial English translation.

International Search Report dated Jul. 22, 2014, issued in Counterpart Application No. PCT/JP2014/064998 (1 page).

Extended (supplementary) European Search Report dated Feb. 1, 2017, issued in counterpart European Application No. 14806856.2. (6 pages).

Extended (Supplementary) European Search Report dated Aug. 2, 2019, issued in counterpart application No. 16873089.3. (7 pages).

"Fine, adj. adv., and n.2", OED Online, Dec. 2019. Oxford Univ. Press, Retrieved from oed.com on Jan. 8, 2020. (43 pages).

* cited by examiner

US 10,669,419 B2

CURABLE RESIN COMPOSITION, STRUCTURAL ADHESIVE, COATING MATERIAL OR FIBER REINFORCED COMPOSITE MATERIAL USING THE SAME, FOAM BODY USING THE SAME, LAMINATE USING THE SAME, AND CURED MATERIAL THEREOF

CROSS-REFERENCE TO RELATED APPLICATIONS

This is a Divisional of U.S. application Ser. No. 14/896,295 filed on Dec. 4, 2015, which is a 371 of PCT/JP2014/064998 filed on Jun. 5, 2014, which claims priority over Japanese application No. 2013-120388 filed on Jun. 7, 2013, the entire contents of which is incorporated herein by reference.

TECHNICAL FIELD

The present invention relates to a curable resin composition containing a polyurethane as a main component having excellent adhesiveness and toughness without reduction of rigidity. Especially, the present invention relates to a structural adhesive, a coating agent and a fiber-reinforced composite material using the curable resin composition, a foam body obtained by expanding the curable resin composition, a laminate obtained by curing the curable resin composition, and a cured material thereof.

BACKGROUND ART

An adhesive containing a polyurethane as the main component exhibits good adhesive property to various adherends such as plastics, woods, and metals. The adhesive is used in various applications because the adhesive exhibits a wide range of physical properties from hard to soft according to a combination of various isocyanate group-containing compounds with various active hydrogen group-containing compounds as raw materials.

On the other hand, a structural adhesive used in assembly such as automobiles, other vehicles and airplanes requires high rigidity in order to improve torsional rigidity of body in addition to adhesive property. Further, it is desired that the structural adhesive has excellent fracture toughness as index for decreasing adhesive failure during collision.

Patent Document 1 discloses a urethane resin adhesive suitable for a structural adhesive of vehicles. However, the adhesive using as the main component the polyurethane had difficulty in the compatibility of high rigidity and adhesiveness.

In addition, a coating agent in which fragility as defect of an epoxy coating material is improved and highly hard property is exhibited is desired, in coated structural bodies such as flooring materials, paving materials and the like.

Further, it is required that a urethane composite material reinforced with reinforced-fibers has high elastic modulus, and then it is important to satisfy both high elastic modulus and toughness.

However, the curable resin composition containing the polyurethane as the main component had difficulty in the compatibility of high rigidity (for example, high elastic modulus), and adhesiveness and/or toughness.

PRIOR ART DOCUMENTS

Patent Document

Patent Document 1: Japanese Unexamined Patent Application Publication No. 2012-251053

SUMMARY OF THE INVENTION

Problems to be Solved by the Invention

The object of the present invention is to provide a curable resin composition having excellent adhesive property and toughness without reduction of rigidity of the cured material obtained.

In addition, the object of the present invention is to provide a technology of using the curable resin composition.

Solutions to the Problems

The inventors have found that the problem is solved by containing polymer fine particles (C) in the polyurethane curable resin composition using as essential components a given polyol (A) and polyisocyanate (B) to complete the present invention.

Specifically, the gist of the present invention is as follows:
[1] A curable resin composition comprising a polyol (A) having an average hydroxyl value of 200 to 1500 mg KOH/g, a polyisocyanate (B), and polymer fine particles (C).
[2] The curable resin composition according to [1], wherein the polyol (A) comprises a polyether polyol (a1).
[3] The curable resin composition according to [1] or [2], wherein the polyol (A) has the average hydroxyl value of 350 to 1500 mg KOH/g, and the composition further comprises a curing catalyst (D).
[4] The curable resin composition according to [2] or [3], wherein the amount of the polyether polyol (a1) is not less than 50 parts by mass per 100 parts by mass of the polyol (A).
[5] A curable resin composition comprising a polyol (A), a polyisocyanate (B), and polymer fine particles (C), wherein the polyol (A) comprises a polyester polyol (a2) as an essential component, and the amount of the polyester polyol (a2) is not less than 20 parts by mass per 100 parts by mass of the polyol (A).
[6] The curable resin composition according to [5], wherein the polyol (A) has the average hydroxyl value of 20 to 1000 mg KOH/g.
[7] The curable resin composition according to [5] or [6], further comprising a curing catalyst (D).
[8] The curable resin composition according to any one of [1] to [7], wherein the polyisocyanate (B) is contained in an amount of 2 to 5000 parts by mass per 100 parts by mass of the polyol (A), and the polymer fine particles (C) are contained in an amount of 1 to 100 parts by mass per 100 parts by mass of the polyol (A) and the polyisocyanate (B).
[9] The curable resin composition according to any one of [1] to [8], wherein the polymer fine particles (C) have the volume average particle diameter of 10 to 2000 nm.
[10] The curable resin composition according to any one of [1] to [9], wherein the polymer fine particles (C) have a core-shell structure.
[11] The curable resin composition according to any one of [1] to [10], wherein the polymer fine particles (C) have one or more core layers selected from the group consisting of a diene rubber, a (meth)acrylate rubber, and an organosiloxane rubber.

[12] The curable resin composition according to [11], wherein the diene rubber is one or more rubbers selected from the group consisting of a butadiene rubber and a butadiene-styrene rubber.

[13] The curable resin composition according to any one of [1] to [12], wherein the polymer fine particles (C) have the shell layer graft-polymerized on the core layer, and the shell layer is polymerized with one or more monomers selected from the group consisting of an aromatic vinyl monomer, a vinyl cyanide monomer, and a (meth) acrylate monomer.

[14] The curable resin composition according to any one of [1] to [13], wherein the polymer fine particles (C) have the shell layer graft-polymerized on the core layer, and the shell layer is polymerized with a monomer having a hydroxyl group.

[15] The curable resin composition according to any one of [1] to [14], wherein the polymer fine particles (C) are dispersed in a state of primary particles in the curable resin composition.

[16] The curable resin composition according to any one of [1] to [15], wherein the polyol (A) comprises a multifunctional polyol having three or more functional groups.

[17] The curable resin composition according to [16], wherein the amount of the multifunctional polyol having three or more functional groups is not less than 20 parts by mass per 100 parts by mass of the polyol (A).

[18] The curable resin composition according to any one of [1] to [17], wherein the polyisocyanate (B) has a cyclic structure, a linear structure or a branched structure.

[19] The curable resin composition according to [18], wherein the polyisocyanate (B) is an aromatic polyisocyanate.

[20] The curable resin composition according to any one of [1] to [19], wherein the polyisocyanate (B) has 2.1 or more isocyanate groups on the average per one molecule.

[21] The curable resin composition according to [18], wherein the polyisocyanate (B) is one or more polyisocyanates selected from the group consisting of an alicyclic polyisocyanate and an aliphatic polyisocyanate.

[22] The curable resin composition according to [21], wherein the polyisocyanate (B) is the alicyclic polyisocyanate.

[23] The curable resin composition according to any one of [1] to [22], wherein the curing catalyst (D) is contained in an amount of 0.001 to 20 parts by mass per 100 parts by mass of the polyol (A) and the polyisocyanate (B).

[24] The curable resin composition according to [23], wherein the curing catalyst (D) is an organotin compound.

[25] The curable resin composition according to any one of [1] to [24], wherein a dehydrating agent (E) is contained in an amount of 0.1 to 30 parts by mass per 100 parts by mass of the polyol (A) and the polyisocyanate (B).

[26] The curable resin composition according to any one of [1] to [25], wherein a ratio ($\beta/\alpha$) of the total molar amount ($\beta$) of the isocyanate group of the polyisocyanate (B) to the total molar amount ($\alpha$) of the hydroxyl group of the polyol (A) is 0.7 to 1.5.

[27] The curable resin composition according to any one of [1] to [26], comprising a urethane prepolymer obtained from the reaction of the polyol (A) and the polyisocyanate (B).

[28] The curable resin composition according to [27], comprising a urethane prepolymer having an isocyanate group obtained from the reaction of the polyol (A) and the polyisocyanate (B) such that an equivalent ratio (NCO/active hydrogen-containing group) of the isocyanate group (NCO) of the polyisocyanate (B) to the active hydrogen-containing group of the polyol (A) is 1.05 to 5.0.

[29] A one pack type moisture-curable resin composition comprising the curable resin composition according to [28].

[30] A two pack type curable resin composition comprising the curable resin composition according to any one of [1] to [28], wherein the composition comprises a first liquid containing the polyisocyanate (B) and a second liquid containing the polyol (A), the polymer fine particles (C) and the curing catalyst (D).

[31] A cured product obtained by curing the curable resin composition according to any one of [1] to [30].

[32] A structural adhesive formed by using the curable resin composition according to any one of [1] to [30].

[33] A coating material formed by using the curable resin composition according to any one of [1] to [30].

[34] A laminate obtained by coating the curable resin composition according to any one of [1] to [30] on a metal or a porous base material, and curing the curable resin composition.

[35] A fiber reinforced composite material formed by using the curable resin composition according to any one of [1] to [30] as a binder of a reinforced fiber.

[36] A foam body obtained by expanding the curable resin composition according to any one of [1] to [30].

[37] The cured product according to [31], wherein the cured product has a glass transition temperature of 75° C. or more.

Effects of the Invention

The curable resin composition of the present invention exhibits excellent toughness and adhesiveness while exhibiting high rigidity (high elastic modulus) in the obtained cured material.

MODES FOR CARRYING OUT THE INVENTION

Hereinafter, the curable resin composition of the present invention is explained in more detail.

The curable resin composition of the present invention is characterized by comprising a polyol (A), a polyisocyanate (B), and polymer fine particles (C), and preferably divided into any of the first embodiment and second embodiment.

A curable resin composition (I) of the first embodiment comprises a polyol (A) having an average hydroxyl value of 200 to 1500 mg KOH/g, a polyisocyanate (B), and polymer fine particles (C).

The curable resin composition (II) of the second embodiment comprises a polyol (A), a polyisocyanate (B), and polymer fine particles (C), wherein the polyol (A) essentially comprises a polyester polyol (a2), and the amount of the polyester polyol (a2) is not less than 20 parts by mass per 100 parts by mass of the polyol (A).

Any of the first embodiment and the second embodiment further may comprise a curing catalyst (D).

The advantage of the first embodiment is higher rigidity (higher elastic modulus) and toughness than that of a conventional composition, and the advantage of the second embodiment is adhesiveness equal to or higher than that of a conventional composition.

The curable resin composition of the present invention comprises as a main component a polyurethane obtained by reacting a polyol (A) with a polyisocyanate (B). The total amount of the polyol (A) and the polyisocyanate (B) is preferably not less than 20% by mass, more preferably not less than 30% by mass, further preferably not less than 40% by mass, and especially preferably not less than 50% by mass of the total amount of the curable resin composition.

The total amount of the polyol (A) and the polyisocyanate (B) may be, for example, not more than 99.5% by mass, not more than 99.0% by mass, or not more than 98.5% by mass.

In the case of less than 20% by mass, toughness and adhesiveness of the obtained cured material may be lowered. In addition, the total amount of the polyol (A) and the polyisocyanate (B) is preferably not less than 50% by mass, more preferably not less than 60% by mass, further preferably not less than 70% by mass, and especially preferably not less than 80% by mass of the total amount excluding an amount of an inorganic component such as an inorganic filler and glass fiber and carbon fiber from that of the curable resin composition, that is, the total amount of components (A) to (E).

The total amount of the polyol (A) and the polyisocyanate (B) may be, for example, not more than 99.9% by mass, not more than 99.5% by mass, or not more than 99.0% by mass of the total amount excluding an amount of an inorganic component such as an inorganic filler and glass fiber and carbon fiber from that of the curable resin composition.

In the case of less than 50% by mass, the toughness and the adhesiveness of the obtained material may be lowered.

<Polyol (A)>

A polyol (A) is used in the curable resin composition of the present invention. The polyol (A) may be used independently or in two or more polyols.

The polyol (A) is a compound having two or more active hydrogens at terminal, and a polyol having two or more functional groups and molecular weight of 50 to 20000. The polyol (A) can include an aliphatic alcohol, an aromatic alcohol, polyether polyol, polyester polyol, polyolefin polyol, acryl polyol and the like.

In the curable resin composition (I) of the first embodiment of the present invention, the polyol (A) has the average hydroxyl value of 200 to 1500 mg KOH/g. It is preferable that the polyol (A) contains a polyether polyol (a1). The polyether polyol (a1) has lower viscosity and excellent workability, and thus the cured material obtained using the polyether polyol has excellent balance of hardness and toughness. When the polyol (A) having a given average hydroxyl value, the polyisocyanate (B) and the polymer fine particles (C) as set forth below are combined, a cured material having high elastic modulus, high toughness and high elongation is obtained. The average hydroxyl value of the polyol (A) is preferably not less than 300 mg KOH/g, more preferably not less than 350 mg KOH/g, further preferably not less than 400 mg KOH/g, even more preferably not less than 440 mg KOH/g, especially preferably not less than 450 mg KOH/g, and preferably not more than 1200 mg KOH/g, more preferably not more than 1100 mg KOH/g, further preferably not more than 1000 mg KOH/g, especially preferably not more than 800 mg KOH/g. In the case of the average hydroxyl value of less than 200 mg KOH/g, effects of toughness and elongation improved by the polymer fine particles (C) become small in some cases. In the case of the average hydroxyl value of more than 1500 mg KOH/g, toughness of the cured material obtained becomes small in some cases.

Hydroxyl value of the polyol (A) is obtained with the method based on the standard of JIS K 1557-1.

In the curable resin composition (I), the amount of the polyether polyol (a1) is preferably not less than 50 parts by mass, more preferably not less than 70 pars by mass, further preferably not less than 80 parts by mass, and especially preferably not less than 90 parts by mass per 100 parts by mass of the polyol (A). The upper limit of the amount of the polyether polyol (a1) is, for example, 100 parts by mass. In the case where the amount of the polyether polyol (a1) is less than 50 parts by mass per 100 parts by mass of the polyol (A), effects for improving toughness become small in some cases.

The concrete examples of the polyether polyol (a1) include a random or block copolymer and the like obtained by ring-opening polymerizing ethylene oxide, propylene oxide, butylene oxide, styrene oxide and the like under the presence of one or two or more active hydrogen-containing initiator (s), and a mixture thereof. The active hydrogen-containing initiator includes diols such as ethylene glycol, diethylene glycol, propylene glycol, dipropylene glycol, 1,3-butane diol, 1,4-butane diol, 1,6-hexane diol, neopentyl glycol, bisphenol A; triols such as trimethylol ethane, trimethylol propane, glycerin; sugars such as monosaccharide, oligosaccharide, polysaccharide; sorbitol; amines such as, ammonia, ethylenediamine, urea, monomethyldiethanol amine, monoethyldiethanol amine.

In the curable resin composition of the second embodiment of the present invention, the polyol (A) contains a polyester polyol (a2) as the essential components, and the amount of the polyester polyol (a2) is not less than 20 parts by mass per 100 parts by mass of the polyol (A). The amount of the polyester polyol (a2) is more preferably not less than 25 parts by mass, further preferably not less than 30 parts by mass, and especially preferably not less than 33 parts by mass per 100 parts by mass of the polyol (A). The amount of the polyester polyol (a2) is for example, not more than 100 parts by mass, preferably not more than 90 parts by mass, more preferably not more than 80 parts by mass, further preferably not more than 70 parts by mass. When the amount of the polyester polyol (a2) of the polyol (A) is less than 20 parts by mass, elastic modulus of the cured material obtained becomes small in some cases. The polyester polyol (a2) has excellent adhesive property and excellent balance of hardness and toughness of the cured material obtained. When the polyol (A) containing the polyester polyol (a2) of not less than 20 parts by mass, the poyisocyanate (B), and the polymer fine particle (C) are combined, the cured material having excellent adhesive property, and high elastic modulus, rigidity and elongation is obtained.

In the curable resin composition (II), the component other than the polyester polyol (a2) may be the polyether polyol. The amount of the polyether polyol is, for example, not less than 10 parts by mass, preferably not less than 15 parts by mass, more preferably not less than 17 parts by mass, and for example, not more than 80 parts by mass, preferably not more than 70 parts by mass, and more preferably not more than 67 parts by mass, per 100 parts by mass of the polyol (A).

In the curable resin composition (II), the polyol (A) preferably has the average hydroxyl value of 20 to 1000 mgKOH/g. The average hydroxyl value is more preferably not less than 50 mgKOH/g, further preferably not less than 100 mgKOH/g, even more preferably not less than 130 mgKOH/g, and more preferably not more than 500 mgKOH/g, further preferably not more than 300 mg KOH/g, and even more preferably not more than 200 mgKOH/g. In the case where the average hydroxyl value is less than 20 mgKOH/g, the elastic modulus of the obtained cured material becomes small, and effects for improving toughness and elongation by the polymer fine particles (C) become small in some cases. In the case where the average hydroxyl value is greater than 1000 mgKOH/g, toughness of the obtained cured material becomes small in some cases.

Functional groups of the polyester polyol and polyether polyol are preferably two or more functional groups.

Hydroxyl values of the polyester polyol and polyether polyol are obtained with the method based on the standard of JIS K 1557-1.

The concrete examples of the polyester polyol (a2) include a polymer obtained by condensating diprotic acids and anhydrides thereof such as maleic acid, fumaric acid, adipic acid, sebacic acid, phthalic acid, dodecanedioic acid, isophthalic acid, azelaic acid, with polyhydric alcohols such as ethylene glycol, propylene glycol, 1,4-butandiol, 1,6-hexandiol, diethylene glycol, dipropylene glycol, neopentyl glycol, 3-methyl-1,5-pentanediol under the presence of the esterification catalyst in the range of the temperature of 150 to 270° C. Further, the polyester polyol (a2) includes a ring-open polymer such as ε-caprolactone and valerolactone, and an active hydrogen compound having two or more active hydrogens such as polycarbonate diol and castor oil.

The polyhydric alcohol can be used with one or two or more kinds selected from sugars, aliphatic alcohols, aromatic alcohols, polyolefin polyols, acrylic polyols and the like.

The sugars include sugars such as monosaccharide, oligosaccharide, polysaccharide and the like.

The aliphatic alcohols may be any of dihydric alcohol and a polyhydric alcohol having a hydricity of three or higher (trihydric alcohol, tetrahydric alcohol and the like). The dihydric alcohol includes alkylene glycol (alkylene glycol having about 1 to 6 of carbon atoms) such as ethylene glycol, propylene glycol, 1,3-propanediol, 1,3-butanediol, 1,4-butanediol, 1,5-pentanediol, 1,6-hexanediol, 3-methyl-1,5-pentanediol, neopentylglycol, and dehydrative condensate (diethyleneglycol, dipropyleneglycol, tripropyleneglycol and the like) from two or more molecules of the alkyleneglycol (for example, 2 to 6 molecules and the like). The trihydric alcohol includes glycerol, trimethylolpropane, trimethylolethane, 1,2,6-hexanetriol (especially trihydric alcohol having about 3 to 10 of carbon atoms). The tetrahydric alcohol includes pentaerythritol, diglycerol and the like.

The aromatic alcohols include bisphenols such as bisphenol A, and bisphenol F; biphenyls such as dihydroxybiphenyl; polyhydric phenol such as hydroquinone, phenol formaldehyde condensate; naphthalenediol and the like.

The polyolefin polyols include polybutadiene polyol, polyisoprene polyol and hydrogenated products thereof.

Acrylic polyols include a copolymer of a monomer having a hydroxyl group such as hydroxyl ethyl (meth) acrylate, hydroxyl butyl (meth) acrylate, and vinyl phenol with a generic monomer such as n-butyl(meth)acrylate, 2-ethylhexyl(meth)acrylate, as well as a mixture thereof.

Among these polyols, a multifunctional polyol of three or more functional groups having three or more hydroxyl groups per one molecule is preferable in the view of high reactivity on the cure and high hard cured materials. That is, the polyol (A) preferably contains the multifunctional polyol having three or more functional groups.

The amount of the multifunctional polyol having three or more functional groups is preferably not less than 20 parts by mass, more preferably not less than 30 parts by mass, further preferably not less than 50 parts by mass, and especially preferably not less than 70 parts by mass per the total amount (100 parts by mass) of the polyol (A). The amount of the multifunctional polyol having three or more functional groups is, for example, not more than 100 parts by mass, preferably not more than 90 parts by mass, and more preferably not more than 80 parts by mass. In the case of less than 20 parts by mass, rigidity of the cured material obtained becomes insufficient in some cases.

The number average molecular weight of the polyol (A) of the present invention is preferably 60 to 900, more preferably 90 to 450, further preferably 120 to 350, and especially preferably 150 to 250 based on polystyrene by GPC. In the case where the number average molecular weight is less than 60, toughness and adhesive property of obtained cured materials are lowered in some cases. In the case where the number average molecular weight is greater than 900, rigidity of obtained cured material is lowered in some cases.

As the constituent of the curable resin composition of the present invention, the amount of the polyol (A) is preferably not less than 10% by mass, more preferably not less than 15% by mass, further preferably not less than 20% by mass, and especially preferably not less than 25% by mass per the total amount of the curable resin composition. The amount of the polyol (A) is preferably not more than 90% by mass, more preferably not more than 85% by mass, further preferably not more than 80% by mass, and especially preferably not more than 75% by mass per the total amount of the curable resin composition. In the case of less than 10% by mass and more than 90% by mass, toughness and adhesive property of the cured material obtained may be lowered.

The amount of the polyol (A) is preferably not less than 25% by mass, more preferably not less than 30% by mass, further preferably not less than 35% by mass, and especially preferably not less than 40% by mass of the total amount excluding the inorganic component from the curable resin composition. The amount of the polyol (A) is preferably not more than 75% by mass, more preferably not more than 70% by mass, further preferably not more than 65% by mass, and especially preferably not more than 60% by mass per the total amount excluding the inorganic component from the curable resin composition. In the case of less than 25% by mass and more than 75% by mass, toughness and adhesive property of the cured material obtained may be lowered.

<Polyisocyanate (B)>

The polyisocyanate (B) is used in the curable resin composition of the present invention. The polyisocyanate (B) may be used individually or in combination of two or more polyisocyanates. The polyisocyanate (B) is an essential component for forming a polyurethane of the curable resin composition.

In the curable resin composition of the present invention, the amount of the polyisocyanate (B) is suitably 2 to 5000 parts by mass to 100 parts by mass of the polyol (A). The amount of the polyisocyanate (B) is more preferably not less than 5 parts by mass, further preferably not less than 10 parts by mass, even more preferably not less than 30 parts by mass, especially preferably not less than 33 parts by mass, and most preferably not less than 50 parts by mass, and more preferably not more than 2000 parts by mass, further preferably not more than 1000 parts by mass, even more preferably not more than 500 parts by mass, especially preferably not more than 300 parts by mass, and most preferably not more than 200 parts by mass, to 100 parts by mass of the polyol (A). In the case of less than 2 parts by mass, elastic modulus of the cured material obtained becomes small in some cases. In the case of more than 5000 parts by mass, toughness of the cured material obtained becomes small in some cases.

A ratio ($\beta/\alpha$) of the total molar amount ($\beta$) of the isocyanate group of the polyisocyanate (B) to the total molar amount (α) of the hydroxyl group of the polyol (A) is preferably 0.7 to 1.5. The ratio is more preferably not less than 0.8, further preferably not less than 0.9, and more preferably not more than 1.4, and further preferably not more than 1.3. When the ratio (β/α) is beyond the above range, physical properties of cured materials obtained are lowered in some cases.

The number of the isocyanate group of the polyisocyanate (B) is 2 or more per one molecule. It is preferable that the polyisocyanate (B) is a polyisocyanate compound having 2.1 or more isocyanate groups on average per one molecule because the improving effects of physical properties (adhesive property, toughness, impact resistance) of the cured material obtained are remarkable by combining the polyisocyanate and the polymer fine particles. The number of the isocyanate group is more preferably 2.3 or more on average per one molecule, further preferably 2.5 or more on average per one molecule, and more preferably 20 or less on average per one molecule, and further preferably 10 or less on average per one molecule.

Conventionally known polyisocyanate compounds are used as the polyisocyanate (B). The polyisocyanate includes, for example, an aliphatic polyisocyanate, an alicyclic polyisocyanate, an araliphatic polyisocyanate, an aromatic polyisocyanate and the like. The concrete examples of these are exemplified below.

The aliphatic polyisocyanate compound includes a diisocyanate compound such as trimethylene diisocyanate, tetramethylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanate, 2,4,4- or 2,2,4-trimethylhexamethylene diisocyanate, 2,6-diisocyanate methyl caproate; a compound having three or more isocyanate groups such as lysine triisocyanate, 1,4,8-triisocyanate octane, 1,6,11-triisocyanate undecane, 1,8-diisocyanate-4-isocyanate methyl octane, 1,3,6-triisocyanate hexane, 2,5,7-trimethyl-1,8-diisocyanate-5-isocyanate methyl octane and the like.

The alicyclic polyisocyanate compound includes a diisocyanate compound such as 1,3-cyclopentene diisocyanate, 1,4-cyclohexane diisocyanate, 1,3-cyclohexane diisocyanate, 3-isocyanate methyl-3,5,5-trimethylcyclohexylisocyanate, 4,4'-methylenebis (cyclohexylisocyanate), methyl-2,4-cyclohexane diisocyanate, methyl-2,6-cyclohexane diisocyanate, 1,3-bis(isocyanatemethyl)cyclohexane, 1,4-bis(isocyanatemethyl)cyclohexane, isophorone diisocyanate; a compound having three or more isocyanate groups such as 1,3,5-triisocyanatecyclohexane, 1,3,5-trimethylisocyanatecyclohexane, 3-isocyanate methyl-3,3,5-trimethylcyclohexylisocyanate, 2-(3-isocyanatepropyl)-2,5-di(isocyanatemethyl)-bicyclo[2,2,1]heptane, 2-(3-isocyanatepropyl)-2,6-di(isocyanatemethyl)-bicyclo[2,2,1]heptane, 3-(3-isocyanatepropyl)-2,5-di(isocyanatemethyl)-bicyclo[2,2,1]heptane, 5-(2-isocyanateethyl)-2-isocyanate methyl-3-(3-isocyanate propyl)-bicyclo[2,2,1]heptane, 6-(2-isocyanateethyl)-2-isocyanatemethyl-3-(3-isocyanate propyl)-bicyclo[2,2,1]heptane, 5-(2-isocyanateethyl)-2-isocyanatemethyl-2-(3-isocyanatepropyl)-bicyclo[2,2,1]heptane, 6-(2-isocyanateethyl)-2-isocyanatemethyl-2-(3-isocyanatepropyl)-bicyclo[2,2,1]heptane and the like.

The araliphatic polyisocyanate compound includes a diisocyanate compound such as 1,3- or 1,4-xylylendiisocyanate or a mixture thereof, ω,ω'-diisocyanate-1,4-diethyl benzene, 1,3- or 1,4-bis (1-isocyanate-1-methylethyl)benzene or a mixture thereof; a compound having three or more isocyanate groups such as 1,3,5-triisocyanate methyl benzene and the like.

The aromatic polyisocyanate compound includes a diisocyanate compound such as m-phenylene diisocyanate, p-phenylene diisocyanate, 4,4'-diphenyl diisocyanate, 1,5-naphthalene diisocyanate, 4,4'-diphenylmethane diisocyanate, 2,4- or 2,6-tolylene diisocyanate, 4,4'-toluidine diisocyanate, 4,4'-diphenyl ether diisocyanate; a compound having three or more isocyanate groups such as triphenylmethane-4,4',4''-triisocyanate, 1,3,5-triisocyanate benzene, 2,4,6-triisocyanatetoluene, 4,4'-diphenylmethane-2,2',5,5'-tetraisocyanate, polymethylene polyphenyl polyisocyanate (polymeric MDI) and the like.

Further, the polyisocyanate compound includes an allophanate-modified product, a biuret modified product, an isocyanurate trimer and the like, and these are obtained by using each of the polyisocyanate compound.

The polyisocyanate (B) is preferably a polyisocyanate having a cyclic structure, a linear structure, or a branched structure, more preferably an aromatic polyisocyanate, and further preferably one or more polyisocyanates selected from the group consisting of an alicyclic polyisocyanate and an aliphatic polyisocyanate. The polyisocyanate having a cyclic structure in a molecule such as the alicyclic polyisocyanate, the araliphatic polyisocyanate, and the aromatic polyisocyanate is more preferable because the physical properties (adhesive property, toughness and impact resistance) of the obtained cured material are remarkably improved by the combination of the polyol (A) and the polymer fine particles (C). Among these, the aromatic polyisocyanate is further preferable, and 4,4'-diphenylmethane diisocyanate, 2,4- or 2,6-tolylene diisocyanate, and polymethylene polyphenyl polyisocyanate (polymeric MDI) are especially preferable.

Among these, the aromatic polyisocyanate compound and the araliphatic polyisocyanate compound are preferable due to excellent adhesive property of the curable resin composition. Especially, 4,4'-diphenyl methane diisocyanate, 2,4- or 2,6-tolylene diisocyanate, and polymethylene polyphenyl polyisocyanate (polymeric MDI) are preferable.

The aliphatic polyisocyanate compound and the alicyclic polyisocyanate compound are preferable due to excellent weather resistance of obtained cured materials. Among these, hexamethylene diisocyanate, isophorone diisocyanate and isocyanurate trimers thereof are preferable.

When yellow discoloration occurs during use of these polyisocyanate compounds, an aliphatic, an alicyclic, or an araliphatic polyisocyanate is preferably used, and the aliphatic polyisocyanate or the alicyclic polyisocyanate is more preferably used. Particularly, when the aliphatic polyisocyanate as the polyisocyanate (B) and an orgatin compound (D) as the urethane curing catalyst are used, the cured material has no yellow discoloration, excellent weather resistance and curing speed, so that the aliphatic polyisocyanate is particularly preferable.

The polyisocyanate (B) of the present invention can be a blocked isocyanate obtained by masking an isocyanate group with a masking agent, and inactivating the isocyanate group at ambient temperature. In the blocked isocyanate masked with the blocking agent, the blocking agent is dissociated by heating (for example, 130 to 160° C.) or humidity to regenerate the isocyanate group. Therefore, the blocked isocyanate can be combined with the polyol (A) in one component type heat or moisture curable resin composition.

The blocking agent includes an alcohol blocking agent, a phenol blocking agent, an oxime blocking agent, a triazole blocking agent, a caprolactam blocking agent and the like.

Preferred examples of an alcohol blocking agent include methanol, ethanol, propanol, hexanol, laurylalcohol, t-butanol, cyclohexanol and the like. Preferred examples of a phenol blocking agent include xylenol, naphthol, 4-methyl-2,6-di-t-butylphenol. Preferred examples of an oxime blocking agent include 2,6-dimethyl-4-heptanone oxime, methylethylketoxime, 2-heptanone oxime and the like. Preferred example of a triazole blocking agent includes 1,2,4-triazole and the like. Preferred example of a caprolactam blocking agent include ε-caprolactam and the like. 3,5-dimethylpyrrazole and the like are used suitably. Among these, methanol, xylenol, and methylethylketoxime are preferable.

As the constituent of the curable resin composition of the present invention, the amount of the polyisocyanate (B) is preferably not less than 10% by mass, more preferably not less than 15% by mass, further preferably not less than 20% by mass, and especially preferably not less than 25% by mass of the total amount of the curable resin composition. The amount of the polyisocyanate (B) is preferably not more than 85% by mass, more preferably not more than 80% by mass, further preferably not more than 75% by mass, and especially preferably not more than 70% by mass per the total amount of the curable resin composition. In the case of less than 10% by mass and more than 85% by mass, toughness and adhesive property of the cured material obtained may be lowered.

The amount of the polyisocyanate (B) is preferably not less than 25% by mass, more preferably not less than 30% by mass, further preferably not less than 35% by mass, and especially preferably not less than 40% by mass per the total amount (for example, the total amount of polyol (A), polyisocyanate (B), polymer fine particles (C), curing catalyst (D) and dehydrating agent (E)) excluding the inorganic component such as the inorganic filler and glass fiber, carbon fiber and the like from the curable resin composition. The amount of the polyisocyanate (B) is preferably not more than 70% by mass, more preferably not more than 65% by mass, further preferably not more than 60% by mass, and especially preferably not more than 55% by mass per the total amount excluding the inorganic component from the curable resin composition. In the case of less than 25% by mass and more than 70% by mass, toughness and adhesive property of the cured material obtained may be lowered.

<Prepolymer from Previous Reaction of Polyol (A) and Polyisocyanate (B)>

In the present invention, it is possible that the polyol (A) is reacted with the polyisocyanate (B) at the curing of the curable resin composition. Also, it is possible that a prepolymer obtained by previously reacting a part or all of the polyol (A) and the polyisocyanate (B) can be used in the curable resin composition. Further, the prepolymer may be obtained by dispersing the polymer fine particles (C) in the polyol (A) to react the mixture with the polyisocyanate (B). Thus, the curable resin composition may contain a urethane prepolymer obtained by the reaction of the polyol (A) and the polyisocyanate (B). By using the prepolymer, the control of reactivity of urethane reaction, the control of the mixing ratio of the two component curable resin composition, the adjustment of the viscosity of the curable resin composition and the suppression of the foaming at curing are accomplished.

A method for synthesizing a urethane prepolymer may be a conventional method. For example, the urethane prepolymer may be obtained by feeding a compound having two or more active hydrogens at a terminal of polyol and the like to a closed reactor equipped with a stirrer, a reflux condenser, a vacuum dehydration device, a nitrogen inlet, and compounding a isocyanate compound, dehydrating the compound under reduced pressure, and reacting the compound and the isocyanate compound under nitrogen streaming at 70 to 100° C. for 3 to 8 hours. Alternatively, the urethane prepolymer may be obtained by reacting of the drop of dried polyols into the isocyanate compound in the view of controlling reactivity. A method for preparing the prepolymer includes a method described in Journal of the Society of Rubber Industry, Japan Vol. 68, page 417, (1995).

The urethane prepolymer having an isocyanate group can be obtained by adjusting the equivalent ratio (NCO/active hydrogen containing group) of isocyanate (NCO) group of the polyisocyanate (B) to the active hydrogen containing group of the polyol (A), to a value greater than 1. It is preferable that the prepolymer contains a urethane prepolymer having the isocyanate group obtained from the range of 1.05 to 5.0 of the equivalent ratio. The equivalent ratio is more preferably not less than 1.5, further preferably not less than 2.0, and more preferably not more than 4.0, further preferably not more than 3.0. In the case of less than 1.05 of the equivalent ratio, the workability of the curable resin composition becomes difficult due to high viscosity of the prepolymer. In addition, in the case of greater than 5 of the equivalent ratio, the amount of foaming may become much during the cure, and the strength of the cured material obtained may become small.

By using the prepolymer, it is possible that the curable resin composition in which all of active hydrogen-containing group of the polyol (A) is reacted is used as the one pack type humidity curable resin composition capable of curing from the reaction of the isocyanate group of the prepolymer with humidity of the atmosphere. Thus, the present invention encompasses one pack type humidity curable resin composition.

In addition, a urethane prepolymer having hydroxyl group may be obtained by controlling the equivalent ratio to a value of less than 1. Concretely, it is preferable that the prepolymer contains a urethane prepolymer obtained from the 0.2 to 0.95 of the equivalent ratio. The equivalent ratio is more preferably not less than 0.25, further preferably not less than 0.30, and more preferably not more than 0.7, further preferably not more than 0.5. In the case of more than 0.95 of the equivalent ratio, the workability of the curable resin composition becomes difficult due to high viscosity of the prepolymer. In addition, in the case of less than 0.2 of the equivalent ratio, the strength of the cured material obtained may become small.

<Polymer Fine Particle (C)>

It is preferable that 1 to 100 parts by mass of polymer fine particles (C) is used to 100 parts by mass of the polyol (A) and the polyisocyanate (B) in the curable resin composition of the present invention. An obtained cured material have excellent toughness, crack resistance, and adhesive property by adding the polymer fine particles (C).

The amount of the polymer fine particles (C) is preferably not less than 2 parts by mass, further preferably not less than 3 parts by mass, even more preferably not less than 4 parts by mass, preferably not more than 70 parts by mass, further preferably not more than 50 parts by mass, and even more preferably not more than 20 parts by mass per 100 parts by mass of the polyol (A) and the polyisocyanate (B) in the view of balance between ease in handling of the curable resin composition obtained and effects of improving toughness and adhesive property of the cured material obtained.

The particle diameter of the polymer fine particles is not particularly limited, and the volume average particle diameter (Mv) is preferably 10 to 2000 nm, more preferably 30 to 600 nm, further preferably 50 to 400 nm, and especially preferably 100 to 200 nm in the view of industrial productivity. The volume average particle diameter of the polymer fine particles can be measured by using Microtrack UPA 150 (manufactured by Nikkiso Co., Ltd.).

In the composition of the present invention, the polymer fine particles (C) preferably have half value width of 0.5 times or more and 1 time or less the number average particle diameter in the number particle size distribution, because the curable resin composition obtained has lower viscosity and is handled easily.

The polymer fine particles (C) have preferably the maximal of two or more in the number particle size distribution in the view of easily realizing a given particle size distribution, more preferably the maximal of two or three, and further preferably the maximal of two in the view of the working and cost during manufacture. Especially, it is preferable that the polymer fine particles (C) contain polymer fine particles having the volume average particle diameter of not less than 10 nm and less than 150 nm in an amount of 10 to 90% by mass and polymer fine particles having the volume average particle diameter of not less than 150 nm and not more than 2000 nm in an amount of 90 to 10% by mass.

It is preferable that the polymer fine particles (C) are dispersed in the state of the primary particle in the curable resin composition. In the present invention, "the polymer fine particles are dispersed in the state of the primary particle in the curable resin composition" (hereinafter referred to as primary dispersion in some cases) mean that the polymer fine particles are substantially dispersed individually (without contacting each other), and the polymer fine particles are dispersed as an individual particle throughout the curable resin composition or the cured material obtained therefrom. The dispersion state of the polymer fine particles can be confirmed by dissolving a part of the curable resin composition in a solvent such as methylethylketone, and measuring the particle diameter by using a particle diameter measuring device with laser beam scattering and the like. Alternatively, after curing the curable resin composition, the dispersion state can be easily confirmed by using transmission electron microscope (TEM) or scanning electron microscope (SEM). When the polymer fine particles are aggregated in the composition, the aggregate cannot be dispersed in the state of primary particles even when the composition is diluted in the solvent due to strong cohesion of the particles. In addition, when the polymer fine particles are not dispersed in the state of primary particles in the composition before curing, the polymer fine particles cannot be dispersed in the state of primary particles in the cured material after curing. Also, when the polymer fine particles are dispersed in the state of primary particles in the cured material, the polymer fine particles are dispersed in the state of primary particles even in the composition before curing.

In the present invention, it is preferable that the polymer fine particles does not contain powdered polymer fine particles or coagulated and dried polymer fine particles in the curable resin composition or the cured material thereof. It is preferable that the polymer fine particles are consisted of polymer fine particles from an aqueous latex without coagulating and drying. In the case of the above polymer fine particles, the dispersion state of the primary particles can be easily realized. On the other hand, in the case of the powdered polymer fine particles, the dispersion state of the primary particles can hardly be realized.

Index representing the dispersion state can include not particularly limited but particle dispersity defined in the following formula 1. The particle dispersity is preferably not less than 20%, more preferably not less than 40%, further preferably not less than 60%, especially preferably not less than 80%, and most preferably not less than 90%. In the case of the particle dispersity of less than 20%, the adhesive property and impact resistance of the cured material obtained may be insufficient.

$$\text{Particle dispersity (\%)} = (1-(B_1/B_0)) \times 100 \quad \text{(formula 1)}$$

Incidentally, in the formula 1, $B_1$ is the number of aggregates consisting of three or more rubber polymer fine particles (B) in contact with each other (in the case where one rubber polymer fine particle (B) is contacted with n polymer fine particle(s), the number of $B_1$ is counted as n), and $B_0$ is the total number of the rubber polymer fine particles (B).

"Stable dispersion" of the polymer fine particles means that the polymer fine particles are dispersed for a long period under general conditions without aggregating, separating and precipitating in the continuous layer. Preferably, the distribution of the polymer fine particles substantially do not change in the continuous layer, and "stable dispersion" can be maintained even when the composition containing the polymer fine particles is heated in the range of no danger so as to stir the composition and lower the viscosity of the composition.

The polymer fine particles (C) may be used individually or in combination of two or more kinds.

The polymer fine particles (C) are not limited particularly, but the polymer fine particles (C) preferably has the core-shell structure, that is, the core-shell structure of two or more layers. In addition, the polymer fine particles (C) can have a structure having three or more layers comprising a core layer, an intermediate layer coated on the core layer, and a shell layer coated on the intermediate layer.

Hereinafter, each layer of the polymer fine particles is concretely explained.

<Core Layer>

The core layer is preferably an elastic core layer having a rubber property in order to improve toughness of the cured material from the curable resin composition of the present invention. For the rubber property, the elastic core layer of the present invention has the gel content of preferably not less than 60% by mass, more preferably not less than 80% by mass, further preferably not less than 90% by mass, and especially preferably not less than 95% by mass. The gel content used herein means that a ratio of an insoluble amount to a total amount of an insoluble amount and a soluble amount in the case where 0.5 g of polymer fine particles obtained by coagulation and dry was immersed in 100 g of toluene, and an insoluble part and a soluble part were divided after standing at 23° C. for 24 hours.

A polymer capable of forming the elastic core layer having the rubber property includes a natural rubber, a rubber elastomer comprising 50 to 100% by mass of at least one monomer (first monomer) selected from a diene monomer (conjugated diene monomer) and (meth)acrylate monomer and 0 to 50% by mass of other polymerizable vinyl monomer (second monomer), a organosiloxane rubber, or combination thereof. It is preferable that the elastic core layer is the diene rubber used with the diene monomer in the view of improving toughness of the cured material. Thus, it is suitable that the polymer fine particles (C) have one or more core layers selected from the group consisting of the diene rubber, the (meth) acrylate rubber, and the organosiloxane rubber. Among these, the elastic core layer is preferably the (meth) acrylate rubber because a various polymers can be designed from the combination of many monomers. In the case where the impact resistance at lower temperature is improved without lowering the heat resistance of the cured material, it is preferable that the elastic core layer is the organosiloxane rubber. In the present invention, (meth) acrylate means acrylate and/or methacrylate.

It is preferable that the diene rubber is one or more rubbers selected from the group consisting of a butadiene rubber and a butadiene-styrene rubber. A monomer (conjugated diene monomer) for constituting the diene rubber used in the elastic core layer includes 1,3-butadiene, isoprene, 2-chloro-1,3-butadiene, 2-methyl-1,3-butadiene and the like. These may be used alone or in combination of two or more monomers. From the view of improving toughness, a butadiene rubber using 1,3-butadiene, or a butadiene-styrene rubber of a copolymer of 1,3-butadiene and styrene is preferable, and a butadiene rubber is more preferable. In addition, a butadiene-styrene rubber is more preferable in the view of improving the transparency of the cured material obtained from the adjustment of refractive index.

A monomer for constituting the (meth)acrylate rubber used in the elastic core layer includes alkyl (meth)acrylates such as methyl(meth)acrylate, ethyl(meth)acrylate, butyl (meth)acrylate, 2-ethylhexyl(meth)acrylate, octyl(meth) acrylate, dodecyl(meth)acrylate, stearyl(meth)acrylate, behenyl(meth)acrylate; aromatic ring containing (meth) acrylates such as phenoxy ethyl(meth) acrylate, benzyl (meth)acrylate; hydroxyalkyl(meth)acrylates such as 2-hydroxyethyl(meth)acrylate, 4-hydroxybutyl(meth)acrylate; glycidyl (meth) acrylates such as glycidyl (meth) acrylate and glycidyl alkyl (meth) acrylate; alkoxyalkyl(meth)acrylates; allylalkyl(meth)acrylates such as allyl(meth)acrylate, and allylalkyl(meth)acrylate; multifunctional (meth)acrylates such as monoethylene glycol di(meth)acrylate, triethylene glycol di(meth)acrylate, tetraethylene glycol di(meth) acrylate and the like. These may be used individually or in combination of two or more (meth) acrylate monomers. The monomer is especially preferably ethyl (meth) acrylate, butyl (meth) acrylate and 2-ethylhexyl (meth) acrylate.

A vinyl monomer (second monomer) polymerizable with the first monomer includes vinyl arenes such as styrene, α-methylstyrene, monochlorostyrene, dichlorostyrene; vinyl carboxylic acids such as acrylic acid, methacrylic acid; vinyl cyanides such as acrylonitrile, methacrylonitrile; halogenated vinyls such as chloro vinyl, bromo vinyl, chloroprene; vinyl acetate; alkenes such as ethylene, propylene, butylene, isobutylene; a multifunctional monomer such as diallylphthalate, triallylcyanurate, triallylisocyanurate, divinylbenzene. The vinyl monomer may be used individually or in combination of two or more vinyl monomers. The monomer is especially preferably styrene.

The organosiloxane rubber for constituting the elastic core layer includes a polysiloxane polymer containing alkyl- or aryl-2-substituted silyloxy units such as dimethyl silyloxy, diethyl silyloxy, methylphenyl silyloxy, diphenyl silyloxy, dimethyl silyloxy-diphenyl silyloxy, or a polysiloxane polymer containing alkyl- or aryl-1-substituted silyloxy units such as a polyorganosiloxane polymer having an organohydrogen silyloxy in which a part of alkyl in the side chain is substituted with hydrogen. The polyorganosiloxane polymer may be used individually or in combination of two or more polymers. Among these, dimethyl silyloxy, methylphenyl silyloxy, dimethylsilyloxy-diphenylsilyloxy is preferable in the view of giving the heat resistance to the cured material, and dimethyl silyloxy is most preferable in the view of easy availability and economy.

In the embodiment that the elastic core layer is formed with the organosiloxane rubber, the organosiloxane polymer is contained in the amount of preferably not less than 80% by mass, and more preferably not less than 90% by mass per 100% by mass of the elastic core layer, so as not to impair heat-resistance of the cured material.

In the core layer, it is preferable that a crosslinked structure is introduced in the polymer polymerized with the above monomer(s) and the polysiloxane polymer in the view of retaining the dispersion stability of the polymer fine particles in the curable resin composition. As methods for introducing the crosslinked structure, a conventional method can be used. A method for introducing the crosslinked structure to the polymer polymerized with the above monomer(s) includes a method for adding to the polymer a crosslinking monomer such as a multifunctional monomer and a mercapto group-containing compound and the like, and polymerizing these. In addition, a method for introducing the crosslinked structure to the polysiloxane polymer includes a method for combining partly a multifunctional alkoxysilane compound at polymerization, a method for introducing a reactive group such as a vinyl reactive group and a mercapto group and the like to the polysiloxane polymer, and adding a polymerizable vinyl monomer or organic peroxide to subjecting to radical reaction, and a method for adding a crosslinking monomer such as a multifunctional monomer and a mercapto group-containing compound to the polysiloxane polymer and polymerizing these.

The multifunctional monomer does not contain butadiene, and includes allylalkyl(meth)acrylate such as allyl(meth) acrylate, allylalkyl(meth)acrylate; allyloxyalkyl(meth)acrylate; multifunctional (meth)acrylate having two or more (meth)acrylic groups such as (poly)ethyleneglycol di (meth) acrylate, butanediol di(meth)acrylate, ethyleneglycol di(meth)acrylate, triethyleneglycol di(meth)acrylate, tetraethylene glycol di(meth)acrylate; diallyl phthalate, triallylcyanurate, triallylisocyanurate, divinylbenzene and the like. Allylmethacrylate, triallyl isocyanurate, butanediol di (meth)acrylate and divinyl benzene are especially preferable.

In the present invention, the glass transition temperature of the core layer is preferably not more than 0° C., more preferably not more than −20° C., further preferably not more than −40° C., and especially preferably not more than −60° C. in order to improve toughness of cured material obtained. Hereinafter, the glass transition temperature is referred to as "Tg" in some cases. The lower limit of Tg is not particularly limited, and, for example, about −150° C.

On the contrary, when the decrease of elastic modulus (rigidity) of cured material obtained is controlled, Tg of the core layer is preferably greater than 0° C., more preferably not less than 20° C., further preferably not less than 50° C., especially preferably not less than 80° C., and most preferably not less than 120° C. The upper limit of Tg is not particularly limited, but is about 200° C.

A polymer for forming the core layer in which Tg is greater than 0° C. and the decrease of rigidity of the cured material obtained can be controlled includes a polymer comprising 50 to 100% by mass (preferably 65 to 99% by mass) of at least one kind of a monomer having Tg greater than 0° C. in homopolymer and 0 to 50% by mass (preferably 1 to 35% by mass) of at least one kind of a monomer having Tg less than 0° C. in homopolymer.

When Tg of the core layer is greater than 0° C., it is preferable that the crosslinked structure is introduced in the core layer. The method of introducing the crosslinked structure includes the method mentioned above.

A monomer having Tg greater than 0° C. in the homopolymer includes those containing the following one or more monomers, but is not particularly limited. The monomer includes an unsubstituted aromatic vinyl compound such as styrene, 2-vinylnaphthalene; a substituted aromatic vinyl compound such as α-methyl styrene; an alkyl-substituted aromatic vinyl compound such as 3-methylstyrene, 4-methylstyrene, 2,4-dimethylstyrene, 2,5-dimethylstyrene, 3,5-dimethylstyrene, 2,4,6-trimethylstyrene; an alkoxy-substituted aromatic vinyl compound such as 4-methoxystyrene, 4-ethoxy styrene; a halogenated aromatic vinyl compound such as 2-chlorostyrene, 3-chlorostyrene; an ester-substituted aromatic vinyl compound such as 4-acetoxystyrene; a hydroxyl-substituted aromatic vinyl compound such as 4-hydroxystyrene; a vinyl ester such as vinyl benzoate, vinylcyclohexanoate; a halogenated vinyl compound such as vinylchloride; an aromatic monomer such as acenaphthalene, indene; an alkylmethacrylate such as methylmethacrylate, ethylmethacrylate, isopropylmethacrylate; an aromatic methacrylate such as phenylmethacrylate; a methacrylate such as isobornyl methacrylate, trimethylsilylmethacrylate; a methacrylic monomer containing methacrylic acid derivative such as methacrylonitrile; an acrylic acid ester such as isobornylacrylate, tert-butylacrylate; an acrylic monomer containing acrylic acid derivative such as acrylonitrile. Further, the monomer includes a monomer having Tg greater than 120° C. such as acrylamide, isopropylacrylamide, N-vinylpyrrolidone, dicyclopentanylmethacrylate, 2-methyl-2-adamantylmethacrylate, 1-adamantylacrylate and 1-adamantylmethacrylate.

The volume average particle diameter of the core layer is preferably 0.03 to 2 μm and more preferably 0.05 to 1 μm. It is difficult to stably obtain a core layer having the volume average particle diameter of less than 0.03 μm in many cases. In the case of the volume average particle diameter of greater than 2 μm, heat-resistance and impact resistance of the molding material are lowered in some cases. The volume average particle diameter can be measured by using Microtrac UPA 150 (manufactured by Nikkiso Co., Ltd)

The amount of the core layer is preferably 40 to 97% by mass, more preferably 60 to 95% by mass, further preferably 70 to 93% by mass, and especially preferably 80 to 90% by mass per 100% by mass of the whole polymer fine particles. In the case of the core layer of less than 40% by mass, effect of improving toughness of the cured material may be lowered. In the case of the core layer of more than 97% by mass, the polymer fine particles are easily aggregated, and the handling of the curable resin composition may become difficult due to high viscosity.

In the present invention, the core layer may be composed of monolayer in some cases, and may be composed of multilayers. In the case where the core layer is composed of multilayer, the polymer composition of each layer may be different each other.

<Intermediate Layer>

An intermediate layer may be formed between the core layer and the shell layer. Especially, the intermediate layer may be formed as a rubber-crosslinked layer as set forth below.

The rubber-crosslinked layer is a polymer of the intermediate layer polymerized with a rubber-crosslinked layer composition containing 30 to 100% by mass of a multifunctional monomer having two or more radical double bonds in the same molecule and 0 to 70% by mass of other vinyl monomer. The rubber-crosslinked layer has effects of lowering the viscosity of the curable resin composition of the present invention, and improving the dispersibility of the polymer fine particles (C) to the polyol (A) or the polyisocyanate (B). In addition, the rubber-crosslinked layer has an effect of improving crosslink density of the core layer and graft efficiency of the shell layer.

The concrete example of the multifunctional monomer is exemplified by the same monomer as the above multifunctional monomer, and the multifunctional monomer is preferably allyl methacrylate and triallyl isocyanurate.

<Shell Layer>

The shell layer existing at outermost of the polymer fine particles is a polymer polymerized with a monomer for forming the shell layer. The shell layer comprises a polymer for improving the compatibility of the polymer fine particles (C) and the polyol (A) or the polyisocyanate (B) and dispersing the polymer fine particles in the state of primary particle in the curable resin composition or the cured material obtained therefrom of the present invention.

The shell polymer for forming the shell layer is preferably grafted on the core layer. More precisely, it is preferable that a monomer used in the formation of the shell layer is graft-polymerized on the core polymer for forming the core layer, and the shell polymer layer is chemically bonded to the rubber core layer. It is preferable that the shell polymer is formed by graft-polymerizing the monomer for forming the shell layer under the presence of the core polymer, and a part or all of the core polymer is covered with the shell polymer. Such a polymerization can be carried out by adding a monomer for constituting the shell polymer to a latex containing the core polymer prepared in the state of an aqueous latex, and polymerizing the monomer and the core polymer.

The monomer for forming the shell layer is preferably the aromatic vinyl monomer, the vinyl cyanide monomer, the (meth) acrylate monomer, the monomer having a hydroxyl group, and more preferably the (meth) acrylate monomer, the monomer having the hydroxyl group, and especially preferably the monomer having the hydroxyl group in the view of the compatibility and the dispersibility of the polymer particle (C) of the curable resin composition. It is preferable that the polymer fine particles (C) have the shell layer of which one or more monomers selected from the group consisting of the aromatic vinyl monomer, the vinyl cyanide monomer, and the (meth)acrylate monomer is graft-polymerized on the core layer. It is more preferably that the polymer fine particles (C) have the shell layer of which the monomer having a hydroxyl group is graft-polymerized on the core layer.

The monomer for forming the shell layer preferably contains a monomer having one or more reactive groups selected from the group consisting of an epoxy group, an oxetane group, a hydroxyl group, an amino group, an imide group, a carboxylic acid group, a carboxylic acid anhydride group, a cyclic ester, a cyclic amide group, a benzoxazine group, and a cyanate ester group, and more preferably contains a monomer having a hydroxyl group, in the view of the chemical bond of the polymer fine particles (C) to the polyol (A) or the polyisocyanate (C) in order to maintain the good dispersibility without coagulating the polymer fine particles (C) in the cured material and the polymer.

In addition, a multifunctional monomer having two or more double bonds is preferably used as a monomer for forming the shell layer because the swelling of the polymer fine particles is prevented in the curable resin composition, or the viscosity of the curable resin composition becomes lower to improve the handling.

The multifunctional monomer is contained in an amount of preferably 1 to 20% by mass, and more preferably 5 to 15% by mass per 100% by mass of a monomer for forming the shell layer.

Concrete example of the aromatic vinyl monomer includes styrene, α-methyl styrene, p-methyl styrene, divinyl benzene and the like.

Concrete example of the vinyl cyanide monomer includes acrylonitrile, and methacrylonitrile.

The concrete example of the (meth)acrylate monomer includes methyl(meth)acrylate, ethyl(meth)acrylate, butyl (meth)acrylate, hydroxyethyl(meth)acrylate, hydroxybutyl (meth)acrylate and the like.

Concrete example of the monomer having an epoxy group includes glycidyl (meth) acrylate and the like.

The concrete example of the monomer having a hydroxyl group includes a hydroxyl linear alkyl (meth) acrylate (especially, hydroxyl linear C1-6 alkyl (meth) acrylate) such as 2-hydroxyethyl(meth)acrylate, hydroxyl propyl(meth) acrylate, 4-hydroxybutyl(meth)acrylate; a caprolacton-modified hydroxyl (meth)acrylate; a hydroxyl branched alkyl (meth)acrylate such as α-(hydroxymethyl)methylacrylate, α-(hydroxymethyl)ethylacrylate; a hydroxyl group-containing (meth)acrylate such as a mono(meth) acrylate of polyesterdiol (especially, saturated polyesterdiol) obtained from dibasic carboxylic acid (for example, phthalic acid) and dihydric alcohol (for example, propylene glycol).

Concrete example of the multifunctional monomer having two or more double bonds is exemplified by the same monomer as the above-mentioned multifunctional monomer. The multifunctional monomer is preferably allylmethacrylate and triallylisocyanurate.

These monomer components may be used individually or in the combination of two or more components.

The shell layer may be formed with other monomer except the above-mentioned monomer. Other monomer include, for example, (meth) acrylamide derivative, maleimide derivative, vinyl ether and the like.

(Meth) acrylamide derivative includes (meth) acrylamide including N-substituted compound. Maleimide derivative includes maleic acid imide including N-substituted compound and the like. Vinylether includes glycidylvinyl ether, allylvinyl ether and the like.

The content of the monomer having a hydroxyl group is, for example, not less than 1% by mass, preferably not less than 5% by mass, and not more than 60% by mass, preferably not more than 50% by mass per the total monomer used in the formation of the shall layer. When the content of the monomer having a hydroxyl group is less than 1% by mass, the polymer fine particles sufficiently cannot have the compatibility or the affinity to the polyol, and the functionality regarding to condensation with the raw resin material in some cases. When the content of the monomer having a hydroxyl group is more than 60% by mass, the polymerization becomes unstable and aggregation and coagulation easily occurs in some cases.

The content of the monomer having a hydroxyl group is preferably not more than 15% by mass, more preferably not more than 8% by mass, further preferably not more than 4% by mass, and especially preferably not more than 2% by mass of the total monomer used in the formation of the shell layer in the view of exhibiting excellent dynamic resistance to cleavage of the cured material obtained by curing the curable resin composition. Most preferably, the shell layer substantially does not contain the monomer having a hydroxyl group.

In addition, the content of the monomer having a hydroxyl group is preferably not less than 4% by mass and not more than 60% by mass, more preferably not less than 8% by mass and not more than 50% by mass, and further preferably not less than 15% by mass and not more than 40% by mass per the total monomer used in the formation of the shell layer in the view of exhibiting excellent T-peel strength of the cured material obtained by curing the curable resin composition.

The graft rate of the shell layer is preferably 70% or more, more preferably 80% or more, and further preferably 90% or more. In the case of less than 70%, the viscosity of the curable resin composition may be increased. Incidentally, the method of calculating the graft rate is as follows.

The powder of the polymer fine particles is obtained by coagulating and dehydrating the aqueous latex containing the polymer fine particles, and drying the polymer fine particles. Then, 2 g of the powder of the polymer fine particles is immersed in 100 g of methylethylketone (MEK) at 23° C. for 24 hours, separated in MEK soluble content and MEK insoluble content, and separated methanol insoluble content from MEK soluble content. Thus, the graft ratio is calculated by determining a ratio of MEK insoluble content to the total content of MEK insoluble content and methanol insoluble content.

<Method for Preparing Polymer Fine Particles>
(Method for Preparing Core Layer)

In the case where the polymer for forming the core layer as the constituent of the polymer fine particles used in the present invention comprises at least one monomer (first monomer) selected from the diene monomer (conjugated diene monomer) and (meth) acrylate monomer, the core layer can be prepared according to emulsion polymerization, suspension polymerization, micro-suspension polymerization and the like, and methods described in WO2005/028546 can be used.

In the case where the polymer for forming the core layer comprises a polysiloxane polymer, the core layer is prepared by emulsion polymerization, suspension polymerization, micro-suspension polymerization and the like, and methods described in WO 2006/070664 can be used.

(Method of Forming Shell Layer and Intermediate Layer)

The intermediate layer can be formed by polymerizing a monomer for forming the intermediate layer with a known radical polymerization. In the case where the rubber elastomer constituting the core layer is obtained as an emulsion, it is preferable that the polymerization of the monomer having two or more double bonds is carried out with the emulsion polymerization.

The shell layer can be formed by polymerizing a monomer for forming the shell layer with a known radical polymerization. In the case where a polymer particle precursor constituting the core layer or the core layer covered with the intermediate layer is obtained as an emulsion, it is preferable that the polymerization of the monomer for forming the shell layer is carried out with the emulsion polymerization, and the shell layer can be prepared according to methods of WO 2005/028546.

The following dispersants can be mentioned as examples of emulsifiers (dispersants) usable in the emulsion polymerization: various acids including alkyl or aryl sulfonic acids such as dioctylsulfosuccinic acid and dodecylbenzenesulfonic acid, alkyl or arylether sulfonic acids, alkyl or arylsulfuric acids such as dodecylsulfuric acids, alkyl or arylether sulfuric acids, alkyl or aryl-substituted phosphoric acids, alkyl or arylether-substituted phosphoric acids, N-alkyl or arylsarcosinic acids such as dodecylsarcosinic acid, alkyl or arylcarboxylic acids such as oleic acid and stearic acid, and alkyl or arylether carboxylic acids, and anionic emulsifiers (dispersants) such as alkali metal salts or ammonium salts of these acids; nonionic emulsifiers (dispersants) such as alkyl or aryl-substituted polyethylene glycols; and derivatives of polyvinyl alcohol, alkyl-substituted celluloses, polyvinyl pyrrolidone, and polyacrylic acid. Any of these emulsifiers (dispersants) may be used alone, or two or more of these may be used in combination.

The amount of the emulsifier (dispersant) is preferably as small as possible, but the dispersion stability of the polymer microparticles in the aqueous latex should be secured. The emulsifier (dispersant) preferably has as high water solubility as possible. An emulsifier (dispersant) having high water solubility can be easily washed out with water, and thus its bad influence on the final polycondensed product can be easily avoided.

In the case of adopting emulsion-polymerization, as known initiators, thermal decomposition initiator such as 2,2'-azobisisobutylonitrile, hydrogen peroxide, potassium persulphate, ammonium persulfate can be used.

In addition, redox type initiators of peroxides such as organic peroxides (e.g. t-butylperoxy isopropyl carbonate, p-menthane hydroperoxide, cumene hydroperoxide, dicumyl peroxide, t-butyl hydroperoxide, di-t-butyl peroxide, t-hexyl peroxide, etc.) and inorganic peroxides (e.g. hydrogen peroxide, potassium persulfate, ammonium persulfate, etc.) in combination with reducing agents (e.g. sodium formaldehyde sulfoxylate, glucose, etc.) as needed and transition metal salts (e.g. ferrous sulfate, etc.) as needed, chelating agents (e.g. disodium ethylenediaminetetraacetate, etc.) as needed, or further phosphorus-containing compounds (e.g. sodium pyrophosphate, etc.) as needed can also be used.

In the case of polymerization using a redox type initiator, it is possible to carry out the polymerization even at a low temperature at which the peroxide does not cause substantially thermal decomposition and to set the polymerization temperature in a wide range, and therefore such a polymerization is preferable. Above all, organic peroxides such as cumene hydroperoxide, dicumyl peroxide, and t-butyl hydroperoxide are preferably used as a redox type initiator. The amount of the initiator or the amount of the reducing agent/transition metal salt/chelating agent when a redox-type initiator is used can be used in the range known in the art. Also, when a monomer having two or more double bonds is polymerized, a known chain transfer agent can be used in the known range. It is possible to additionally use a surfactant, and such use of the surfactant is also included in the known range.

The conditions to be applied in the polymerization, such as polymerization temperature, pressure, and deoxidation, are those known in the art. In addition, polymerization of the monomer for intermediate layer formation may be carried out in one stage or in two or more stages. Such polymerization includes, for example, a method of adding a monomer for intermediate layer formation at one time to an emulsion of a rubber elastic body constituting an elastic core layer, a method of continuously adding a monomer for intermediate layer formation to an emulsion of a rubber elastic body constituting an elastic core layer, and, in addition, a method of carrying out polymerization after adding an emulsion of a rubber elastic body constituting an elastic core layer to a reactor into which a monomer for intermediate layer formation has previously been charged.

<Curing Catalyst (D)>

For the curable resin composition of the present invention, it is possible to use a curing catalyst as the component (D) as needed. The curing catalyst is not particularly limited, but includes a catalyst that is commonly used to promote the urethane reaction. Specific examples of the curing catalyst include metal salts of carboxylic acids, such as tin 2-ethylhexanoate, tin versatate, bismuth 2-ethylhexanoate, potassium acetate, potassium octylate, lead octylate, lead naphthenate, nickel naphthenate, and cobalt octylate; tetravalent organic tin compounds, such as dibutyltin dilaurate, dibutyltin maleate, dibutyltin phthalate, dibutyltin dioctanoate, dibutyltin bis(2-ethylhexanoate), dibutyltin bis(methyl maleate), dibutyltin bis(ethyl maleate), dibutyltin bis(butyl maleate), dibutyltinbis(octyl maleate), dibutyltinbis(tridecyl maleate), dibutyltin bis(benzyl maleate), dibutyltin diacetate, dioctyltin bis(ethyl maleate), dioctyltin bis(octyl maleate), dibutyltin dimethoxide, dibutyltin bis(nonyl phenoxide), dibutenyltin oxide, dibutyltin bis(acetylacetonate), dibutyltin bis(ethyl acetoacetate), dibutyltin bisisooctylthioglycolate, dibutyltin dichloride, dibutyltin oxide, a reaction product of dibutyltin oxide and a silicate compound, a reaction product of a dialkyltin dicarboxylate (e.g. dibutyltin dilaurate) and a silicate compound, and a reaction product of dibutyltin oxide and a phthalic acid ester; organic titanates, such as tetraisopropoxy titanium, tetra-n-butoxy titanium, diisopropoxytitanium bis(acetylacetonate), and diisopropoxytitanium bis(ethylacetoacetate); organoaluminum compounds, such as aluminum tris(acetylacetonate), aluminum tris(ethylacetoacetate), and diisopropoxyaluminum ethylacetoacetate; zirconium compounds, such as zirconium tetrakis(acetylacetonate); amine compounds, such as triamylamine, trihexylamine, trioctylamine, triallylamine, triphenylamine, triethanolamine, triethylamine, tripropylamine, diethylethanolamine, dimethylaminoethoxyethanol, N,N,N'-trimethylaminoethylethanolamine, N,N,N',N'',N''-pentamethyldiethylenetriamine, N,N,N',N'-tetramethylhexamethylenediamine, N,N,N',N'-tetramethylethylenediamine, N,N',N'-trimethylaminoethylpiperazine, N,N-dimethylcyclohexylamine, bis(2-dimethylaminoethyl) ether, guanidine, diphenylguanidine, 2,4,6-tris(dimethylaminomethyl)phenol, N-methylmorpholine, N-ethylmorpholine, N-octadecylmorpholine, N-methylpiperazine, N-methyl-N'-(2-hydroxypropyl) piperazine, 2-ethyl-4-methylimidazole, 1,8-diazabicyclo(5,4,0)undecene (DBU), 1,5-diazabicyclo(4,3,0)nonene (DBN), and 1,4-diazabicyclo[2.2.2]octane (DABCO), and the like. Among them, the curing catalyst (D) is preferably an organotin compound from the viewpoint of suppressing yellowing. Also, salts of the amine compounds with carboxylic acids or organic acids (e.g. phenols), such as octylic acid salt of DBU, are effective as latent curing catalysts.

The amount of the curing catalyst used is preferably 0.001 to 20 parts by mass, more preferably 0.01 to 5 parts by mass, even more preferably 0.05 to 2 parts by mass, particularly preferably 0.1 to 1 part by mass per 100 parts by mass of the total amount of the polyol (A) and the polyisocyanate (B). If the amount of the curing catalyst used is less than 0.001 parts by mass, curing is slow in some cases. If the amount of the curing catalyst used exceeds 20 parts by mass, curing is too fast, resulting in difficulty in handling sometimes.

<Filler>

A filler may be added to the curable resin composition of the present invention. The filler includes, for example, reinforcing fillers, such as fumed silica, precipitated silica, crystalline silica, molten silica, dolomite, anhydrous silicic acid, hydrous silicic acid, and carbon black; fillers, such as ground calcium carbonate, colloidal calcium carbonate, magnesium carbonate, barium carbonate, barium sulfate, diatomaceous earth, baked clay, clay, talc, baryte, anhydrous gypsum, titanium oxide, bentonite, organic bentonite, ferric oxide, aluminum fine powder, flint powder, zinc oxide, active zinc flower, mica, zinc flower, white lead, lithopone, zinc sulfide, Shirasu Balloon, glass microballoon, organic microballoon of a phenol resin or a vinylidene chloride resin, and resin powder such as PVC powder and PMMA powder; fibrous fillers such as asbestos, glass fiber and filament, and the like.

In addition to the above, for example, colored pigments such as titanium oxide, lead chromate, chromium oxide, ultramarine, cobalt blue, cyanine blue, cyanine green, lake red, and quinacridone red may also be used.

When the filler is used, the amount used is preferably 1 to 250 parts by mass, more preferably 10 to 200 parts by mass per 100 parts by mass of the total amount of the polyol (A) and the polyisocyanate (B).

<Flame Retardant>

If necessary, a flame retardant, such as a phosphorus-based plasticizer (e.g. ammonium polyphosphate and tricresyl phosphate), aluminum hydroxide, magnesium hydroxide, and a thermally expandable graphite, may be added to the curable resin composition of the present invention. The flame retardant may be used alone or in combination of two or more thereof.

As the ammonium polyphosphate, conventionally known ones can be widely used. Among these, from the viewpoint of water resistance, it is preferable to use a surface-treated ammonium polyphosphate such as ammonium polyphosphate which is coated with a resin and microencapsulated, and a surface-modified ammonium polyphosphate, and it is more preferable to use ammonium polyphosphate in which the surface is coated with a melamine-formaldehyde resin.

When the flame retardant is used, its amount is preferably 5 to 200 parts by mass, more preferably 10 to 100 parts by mass per 100 parts by mass of the total amount of the polyol (A) and the polyisocyanate (B).

<Dispersant>

If necessary, a dispersant may be added to the curable resin composition of the present invention. A pigment dispersed paste obtained by mixing and dispersing a dispersant and a pigment according to known methods may be incorporated into the curable resin composition of the present invention. A commercially available dispersant may be used. Examples of the commercially available dispersant include, for example, ANTI-TERRA (registered trademark)-U, ANTI-TERRA (registered trademark)-U100, ANTI-TERRA (registered trademark)-204, ANTI-TERRA (registered trademark)-205, DISPERBYK (registration trademark)-101, DISPERBYK (registered trademark)-102, DISPERBYK (registered trademark)-103, DISPERBYK (registered trademark)-106, DISPERBYK (registered trademark)-108, DISPERBYK (registered trademark)-109, DISPERBYK (registered trademark)-110, DISPERBYK (registered trademark)-111, DISPERBYK (registered trademark)-112, DISPERBYK (registered trademark)-116, DISPERBYK (registered trademark)-130, DISPERBYK (registered trademark)-140, DISPERBYK (registered trademark)-142, DISPERBYK (registered trademark)-145, DISPERBYK (registered trademark)-161, DISPERBYK (registered trademark)-162, DISPERBYK (registered trademark)-163, DISPERBYK (registered trademark)-164, DISPERBYK (registered trademark)-166, DISPERBYK (registered trademark)-167, DISPERBYK (registered trademark)-168, DISPERBYK (registered trademark)-170, DISPERBYK (registered trademark)-171, DISPERBYK (registered trademark)-174, DISPERBYK (registered trademark)-180, DISPERBYK (registered trademark)-182, DISPERBYK (registered trademark)-183, DISPERBYK (registered trademark)-184, DISPERBYK (registered trademark)-185, DISPERBYK (registered trademark)-2000, DISPERBYK (registered trademark)-2001, DISPERBYK (registered trademark)-2008, DISPERBYK (registered trademark)-2009, DISPERBYK (registered trademark)-2022, DISPERBYK (registered trademark)-2025, DISPERBYK (registered trademark)-2050, DISPERBYK (registered trademark)-2070, DISPERBYK (registered trademark)-2096, DISPERBYK (registered trademark)-2150, DISPERBYK (registered trademark)-2155, DISPERBYK (registered trademark)-2163, DISPERBYK (registered trademark)-2164, BYK (registered trademark)-P104, BYK (registered trademark)-P104S, BYK (registered trademark)-P105, BYK (registration trademark)-9076, BYK (registered trademark)-9077, BYK (registered trademark)-220S, ANTI-TERRA (registered trademark)-250, DISPERBYK (registered trademark)-187, DISPERBYK (registered trademark)-190, DISPERBYK (registered trademark)-191, DISPERBYK (registered trademark)-192, DISPERBYK (registered trademark)-193, DISPERBYK (registered trademark)-194, DISPERBYK (registered trademark)-198, DISPERBYK (registered trademark)-2010, DISPERBYK (registered trademark)-2012, DISPERBYK (registered trademark)-2015, DISPERBYK (registered trademark)-2090, DISPERBYK (registered trademark)-2091, DISPERBYK (registered trademark)-2095 (all in the foregoing manufactured by BYK-Chemie GmbH.), DISPARLON (registered trademark) 2150, DISPARLON (registered trademark) KS-860, DISPARLON (registered trademark) KS-873N, DISPARLON (registered trademark) 7004, DISPARLON (registered trademark) 1831, DISPARLON (registered trademark) 1850, DISPARLON (registered trademark) 1860, DISPARLON (registered trademark) DA-1401, DISPARLON (registered trademark) PW-36, DISPARLON (registered trademark) DA-1200, DISPARLON (registered trademark) DA-550, DISPARLON (registered trademark) DA-703-50, DISPARLON (registered trademark) DA-7301, DISPARLON (registered trademark) DN-900, DISPARLON (registered trademark) DA-325, DISPARLON (registered trademark) DA-375, DISPARLON (registered trademark) DA-234 (all in the foregoing manufactured by Kusumoto Chemicals, Ltd.), EFKAPOLYMER4550 (manufactured by EFKA Company), SOLSPERSE (registered trademark) 27000, SOLSPERSE (registered trademark) 41000, and SOLSPERSE (registered trademark) 53095 (all in the foregoing manufactured by Avecia Ltd.). Among these, ANTI-TERRA (registered trademark)-U100, DISPERBYK (registered trademark)-102, DISPERBYK (registered trademark)-106, DISPERBYK (registered trademark)-108, DISPERBYK (registered trademark)-109, DISPERBYK (registration trademark)-111, DISPERBYK (registered trademark)-116, DISPERBYK (registered trademark)-145, DISPERBYK (registered trademark)-180, DISPERBYK (registered trademark)-185, DISPERBYK (registered trademark)-2008, DISPERBYK (registered trademark)-2096, DISPERBYK (registered trademark)-2155, BYK (registered trademark)-P105, BYK (registered trademark)-9076, BYK (registered trademark)-9077, DISPERBYK (registered trademark)-191, DISPERBYK (registered trademark)-192, DISPERBYK (registered trademark)-2090, DISPERBYK (registration trademark)-2095, DISPARLON (registered trademark) DA-550, DISPARLON (registered trademark) DA-325, DISPARLON (registered trademark) DA-375, and DISPARLON (registered trademark) DA-234 are preferable because they have a high nonvolatile content.

The number average molecular weight of the dispersant is preferably 1000 to 100000. If the number average molecular weight of the dispersant is less than 1000, sufficient dispersion stability may not be obtained. If the number average molecular weight exceeds 100000, the viscosity is too high to handle in some cases. The number average molecular weight of the dispersant is more preferably 2000 to 50000, and even more preferably 4000 to 50000.

When the dispersant is used, the amount used is preferably 0.1 to 10 parts by mass, more preferably 0.2 to 3 parts by mass, and even more preferably 0.3 to 1 part by mass per 100 parts by mass of the total amount of the polyol (A) and the polyisocyanate (B).

<Defoaming Agent>

If necessary, a defoaming agent may be added to the curable resin composition of the present invention. As the defoaming agent, it is possible to use those which are commercially available. Examples of the commercially available defoaming agent include, for example, defoaming agents, such as BYK (registered trademark)-051, BYK (registered trademark)-052, BYK (registered trademark)-053, BYK (registered trademark)-054, BYK (registered trademark)-055, BYK (registered trademark)-057, BYK (registered trademark)-1752, BYK (registered trademark)-1790, BYK (registered trademark)-060N, BYK (registered trademark)-063, BYK (registered trademark)-065, BYK (registered trademark)-066N, BYK (registered trademark)-067A, BYK (registered trademark)-077, BYK (registered trademark)-088, BYK (registered trademark)-141, BYK (registered trademark)-354, BYK (registered trademark)-392, BYK (registered trademark)-011, BYK (registered trademark)-012, BYK (registered trademark)-017, BYK (registered trademark)-018, BYK (registered trademark)-019, BYK (registered trademark)-020, BYK (registered trademark)-021, BYK (registered trademark)-022, BYK (registered trademark)-023, BYK (registered trademark)-024, BYK (registered trademark)-025, BYK (registered trademark)-028, BYK (registered trademark)-038, BYK (registered trademark)-044, BYK (registered trademark)-093, BYK (registered trademark)-094, BYK (registered trademark)-1610, BYK (registered trademark)-1615, BYK (registered trademark)-1650, BYK (registered trademark)-1730, and BYK (registered trademark)-1770 (all in the foregoing manufactured by BYK-Chemie GmbH.); acrylic defoaming agents, such as DISPARLON (registered trademark) OX-880EF, DISPARLON (registered trademark) OX-881, DISPARLON (registered trademark) OX-883, DISPARLON (registered trademark) OX-883HF, DISPARLON (registered trademark) OX-70, DISPARLON (registered trademark) OX-77EF, DISPARLON (registered trademark) OX-60, DISPARLON (registered trademark) OX-710, DISPARLON (registered trademark) OX-720, DISPARLON (registered trademark) OX-720EF, DISPARLON (registered trademark) OX-750HF, DISPARLON (registered trademark) LAP-10, DISPARLON (registered trademark) LAP-20, and DISPARLON (registered trademark) LAP-30; silicone-based acrylic composite-type defoaming agents, such as DISPARLON (registered trademark) OX-66 and DISPARLON (registered trademark) OX-715; vinyl-based defoaming agents, such as DISPARLON (registered trademark) 1950, DISPARLON (registered trademark) 1951, DISPARLON (registered trademark) 1952, DISPARLON (registered trademark) P-410EF, DISPARLON (registered trademark) P-420, DISPARLON (registered trademark) P-450, DISPARLON (registered trademark) P-425, and DISPARLON (registered trademark) PD-7; and silicone-based defoaming agents, such as DISPARLON (registered trademark) 1930N and DISPARLON (registered trademark) 1934 (all in the foregoing manufactured by Kusumoto Chemicals, Ltd.).

When the defoaming agent is used, the amount used is preferably 0.05 to 10 parts by mass, more preferably 0.2 to 5 parts by mass, and even more preferably 0.3 to 3 parts by mass per 100 parts by mass of the total amount of the polyol (A) and the polyisocyanate (B).

<Plasticizer>

A plasticizer may be added to the curable resin composition of the present invention as needed. By adding a plasticizer, the viscosity and the slump property of the curable resin composition, as well as the mechanical properties such as tensile strength, elongation and the like of the cured product obtained by hardening the composition can be adjusted. Examples of the plasticizer include phthalate esters such as dibutyl phthalate, diheptyl phthalate, di(2-ethylhexyl) phthalate, and butylbenzyl phthalate; non-aromatic dibasic acid esters such as dioctyl adipate, dioctyl sebacate, dibutyl sebacate, and isodecyl succinate; glycol esters such as diethylene glycol benzoate and dipentaerythritol hexanoate; aliphatic esters such as butyl oleate, and methyl acetyl ricinoleate; phosphate esters such as tricresyl phosphate and tributyl phosphate; trimellitic acid esters; chlorinated paraffins; hydrocarbon based oils such as alkyldiphenyl and partially hydrogenated terphenyl; process oils; epoxy plasticizers such as epoxidized soybean oil and benzyl epoxystearate.

Since the strength of the cured product from the curable resin composition is decreased as the amount of the plasticizer used is increased, it is preferable to reduce the amount of the plasticizer to be used, and such amount is preferably 100 parts by mass or less, more preferably 50 parts by mass or less, even more preferably 30 parts by mass or less, and especially preferably 10 parts by mass or less per 100 parts by mass of the total amount of the polyol (A) and the polyisocyanate (B). It is most preferable for the curable resin composition to contain no plasticizer.

<Solvent>

If necessary, a solvent may be used for the curable resin composition of the present invention in order to reduce the viscosity of the composition, increase the thixotropy, and improve the workability. As the solvent, there is no particular limitation, and various compounds can be used. Specific examples of the solvent include hydrocarbon solvents such as toluene, xylene, heptane, hexane, petroleum-based solvents; halogen-based solvents such as trichloroethylene; ester-based solvents such as ethyl acetate and butyl acetate; ketone-based solvents such as acetone, methyl ethyl ketone, methyl isobutyl ketone; ether-based solvents such as dibutyl ether, dipentynyl ether, diethylene glycol monomethyl ether, and diethylene glycol monoethyl ether; and silicone-based solvents such as hexamethylcyclotrisiloxane, octamethylcyclotetrasiloxane, and decamethylcyclopentasiloxane. When the solvent is used, from the problem of outside air pollution, the boiling point of the solvent is preferably 150° C. or more, more preferably 200° C. or more, and especially preferably 250° C. or more. These solvents may be used alone or in combination of two or more thereof.

However, if the amount of the solvent to be added is large, there are cases where influence on the environment and toxicity to human body are high, so that it is preferable to reduce the amount of solvent to be used. Therefore, the amount of the solvent is preferably 50 parts by mass or less, more preferably 30 parts by mass or less, and even more preferably 10 parts by mass or less per 100 parts by mass of the total amount of the polyol (A) and the polyisocyanate (B). It is particularly preferable for the curable resin composition to contain no solvent.

Meanwhile, since the polyol (A) and the polyisocyanate (B) of the present invention can select a relatively low viscosity material, it is easy to design a coating composition that can be applied in a non-aqueous system and/or a non-solvent system (or in a high solid system where solvent content is small). An aqueous emulsion composition requires a long time for film-forming at a low temperature or a high humidity, and there is a problem that it is difficult to apply such coating at a cold time. Therefore, the curable resin composition of the present invention is preferably a non-aqueous type curable resin composition. Furthermore, from the viewpoint of reducing environmental load, the curable composition of the present invention is preferably a non-solvent type (or a high solid type) curable composition.

When the non-aqueous type curable composition is formed, water content in the curable composition of the present invention is preferably 10 parts by mass or less, more preferably 1 part by mass or less, and even more preferably 0.1 parts by mass or less per 100 parts by mass of the total amount of the polyol (A) and the polyisocyanate (B). It is most preferable for the curable composition to contain substantially no water. If the water content exceeds this range, the properties of the cured product may be deteriorated.

<Tackifier>

A tackifier may be added to the curable resin composition of the present invention as needed. Although the tackifier is not particularly limited, commonly used one can be used irrespective of the state at ordinary temperatures, which may be either a solid or a liquid. Specific examples thereof include styrene based block copolymers and hydrogenated products thereof, phenol resins, modified phenol resins (for example, cashew oil-modified phenol resins, tall oil-modified phenol resins and the like), terpenephenol resins, xylene-phenol resins, cyclopentadiene-phenol resins, coumarone-indene resins, rosin-based resins, rosin ester resins, hydrogenated rosin ester resins, xylene resins, low molecular weight polystyrene-based resins, styrene copolymer resins, petroleum resins (for example, C5 hydrocarbon resins, C9 hydrocarbon resins, C5C9 hydrocarbon copolymerized resins and the like), hydrogenated petroleum resins, terpene based resins, DCPD resins petroleum resins, and the like. These may be used alone or in combination of two or more thereof. As the styrene-based block copolymers and hydrogenated products thereof, there are exemplified styrene-butadiene-styrene block copolymers (SBS), styrene-isoprene-styrene block copolymers (SIS), styrene-ethylene butylene-styrene block copolymers (SEBS), styrene-ethylenepropylene-styrene block copolymers (SEPS), styrene-isobutylene-styrene block copolymers (SIBS), and the like. These tackifiers may be used alone or in combination of two or more thereof.

When the tackifier is used, the amount used is preferably 5 to 100 parts by mass, and more preferably 10 to 50 parts by mass per 100 parts by mass of the total amount of the polyol (A) and the polyisocyanate (B).

<Leveling Agent>

If necessary, a leveling agent may be added to the composition of the present invention. Commercially available products may be used as the leveling agent. Examples of the commercially available products include, for example, BYKETOL (registered trademark)-OK, BYKETOL (registered trademark)-SPECIAL, BYKETOL (registered trademark)-AQ, BYKETOL (registered trademark)-WS (all in the foregoing manufactured by BYK-Chemie GmbH.), DISPARLON (registered trademark) 1970, DISPARLON (registered trademark) 230, DISPARLON (registered trademark) LF-1980, DISPARLON (registered trademark) LF-1982, DISPARLON (registered trademark) LF-1983, DISPARLON (registered trademark) LF-1984, and DISPARLON (registered trademark) LF-1985 (all in the foregoing manufactured by Kusumoto Chemicals, Ltd.).

When the leveling agent is used, the amount used is preferably in a range of 0.05 to 10 parts by mass, more preferably in a range of 0.2 to 5 parts by mass, and even more preferably in a range of 0.3 to 3 parts by mass per 100 parts by mass of the total amount of the polyol (A) and the polyisocyanate (B).

<Thixotropic Agent>

A thixotropic agent (anti-sagging agent) may be added to the curable resin composition of the present invention as needed in order to prevent sagging and to improve workability. Although the anti-sagging agent is not particularly limited, examples thereof include, for example, polyamide waxes; hydrogenated castor oil derivatives; metal soaps such as calcium stearate, aluminum stearate, and barium stearate, and the like. The fumed silica shown as the filler can also be used as a thixotropic agent. When a rubber powder having a particle size of 10 to 500 µm as disclosed in Japanese Unexamined Patent Application Publication No. Hei11-349916 or an organic fiber as disclosed in Japanese Unexamined Patent Application Publication No. 2003-155389 is used, a composition having a high thixotropy and favorable workability may be obtained. These thixotropic agents (anti-sagging agents) may be used alone or in combination of two or more thereof.

When the thixotropic agent is used, the amount used is in the range of preferably 0.1 to 20 parts by mass per 100 parts by mass of the total amount of the polyol (A) and the polyisocyanate (B).

<Epoxy Resin>

An epoxy resin may be added to the curable resin composition of the present invention as needed.

The examples of the epoxy resin include, for example, known epoxy resins, such as bisphenol A type epoxy resins, bisphenol F type epoxy resins, novolak type epoxy resins, glycidyl ester type epoxy resins, hydrogenated bisphenol A (or F) type epoxy resins, glycidyl ether type epoxy resins, amino-containing glycidyl ether resins, and epoxy compounds obtained by addition reaction of bisphenol A (or F) or polybasic acids to these epoxy resins.

When the epoxy resin is used, the amount used is within a range of 0.1 to 30 parts by mass per 100 parts by mass of the total amount of the polyol (A) and the polyisocyanate (B).

<Antioxidant>

An antioxidant (antiaging agent) may be added to the curable resin composition of the present invention as needed. When the antioxidant is used, heat resistance of the cured product can be enhanced. Examples of the antioxidant include, for example, hindered phenolic, monophenolic, bisphenolic, and polyphenolic antioxidants, and of these, hindered phenolic antioxidants are especially preferred. Similarly, hindered amine-based light stabilizers presented as TINUVIN (registered trademark) 622LD, TINUVIN (registered trademark) 144, CHIMASSORB (registered trademark) 944LD, and CHIMASSORB (registered trademark) 119FL (all in the foregoing manufactured by Ciba Specialty Chemicals Inc.); MARK LA-57, MARK LA-62, MARK LA-67, MARK LA-63 and MARK LA-68 (all in the foregoing manufactured by Asahi Denka Kogyo K.K.); and SANOL (registered trademark) LS-770, SANOL (registered trademark) LS-765, SANOL (registered trademark) LS-292, SANOL (registered trademark) LS-2626, SANOL (registered trademark) LS-1114, and SANOL (registered trademark) LS-744 (all in the foregoing manufactured by Sankyo Co., Ltd.) may be used.

When the antioxidant is used, the amount used is within the range of preferably 0.1 to 10 parts by mass, and more preferably 0.2 to 5 parts by mass per 100 parts by mass of the total amount of the polyol (A) and the polyisocyanate (B).

<Light Stabilizer>

A light stabilizer may be used to the curable resin composition of the present invention as needed. When the light stabilizer is used, photo-oxidative deterioration of the cured product can be prevented. Examples of the light stabilizer include preferably benzotriazole-based compounds, hindered amine-based compounds, and benzoate-based compounds, among which the hindered amine-based compounds are more preferred. In particular, it is preferred to use a tertiary amine-containing hindered amine-based light stabilizer for the improvement in storage stability of the composition. As the tertiary amine-containing hindered amine-based light stabilizer, there may be exemplified light stabilizers, such as TINUVIN (registered trademark) 622LD, TINUVIN (registered trademark) 144, CHIMASSORB (registered trademark) 119FL (all in the foregoing manufactured by BASF); MARK LA-57, LA-62, LA-67, and LA-63 (all in the foregoing manufactured by ADEKA Corp.); and SANOL (registered trademark) LS-765, LS-292, LS-2626, LS-1114, and LS-744 (all in the foregoing manufactured by Sankyo Co., Ltd.).

When the light stabilizer is used, the amount used is in a range of preferably 0.1 to 10 parts by mass, and more preferably 0.2 to 5 parts by mass per 100 parts by mass of the total amount of the polyol (A) and the polyisocyanate (B).

<Ultraviolet Absorber>

An ultraviolet absorber may be used in the curable resin composition of the present invention as needed. When the ultraviolet absorber is used, the surface weather resistance of the cured product can be improved. Examples of the ultraviolet absorber include benzophenone-based compounds, benzotriazole-based compounds, salicylate-based compounds, substituted tolyl-based compounds, and metal chelate-based compounds and the like. Benzotriazole-based compounds are particularly preferred.

When the ultraviolet absorber is used, the amount used is preferably within a range of 0.1 to 10 parts by mass, and more preferably within a range of 0.2 to 5 parts by mass per 100 parts by mass of the total amount of the polyol (A) and the polyisocyanate (B). Also, it is preferred that the phenolic- or hindered phenolic-based antioxidant, the hindered amine-based light stabilizer, and the benzotriazole-based ultraviolet absorber are used in combination.

<Silane Coupling Agent>

A silane coupling agent may be added to the curable resin composition of the present invention as needed. Such addition of the silane coupling agent can improve the adhesion. Specifically, as the silane coupling agent, there can be used isocyanate group-containing silanes such as γ-isocyanatopropyltrimethoxysilane, γ-isocyanatopropyltriethoxysilane, γ-isocyanatopropylmethyldiethoxysilane, γ-isocyanatopropylmethyldimethoxysilane, (isocyanatomethyl)trimethoxysilane, (isocyanatomethyl)dimethoxymethylsilane, (isocyanatomethyl)triethoxysilane, and (isocyanatomethyl)diethoxymethylsilane; amino group-containing silanes such as γ-aminopropyltrimethoxysilane, γ-aminopropyltriethoxysilane, γ-aminopropyltriisopropoxysilane, γ-aminopropylmethyldimethoxysilane, γ-aminopropylmethyldiethoxysilane, γ-(2-aminoethyl)aminopropyltrimethoxysilane, γ-(2-aminoethyl)aminopropylmethyldimethoxysilane, γ-(2-aminoethyl)aminopropyltriethoxysilane, γ-(2-aminoethyl)aminopropylmethyldiethoxysilane, γ-(2-aminoethyl)aminopropyltriisopropoxysilane, γ-(6-aminohexyl)aminopropyltrimethoxysilane, 3-(N-ethylamino)-2-methylpropyltrimethoxysilane, γ-ureidopropyltrimethoxysilane, γ-ureidopropyltriethoxysilane, N-phenyl-γ-aminopropyltrimethoxysilane, N-benzyl-γ aminopropyltrimethoxysilane, N-vinylbenzyl-γ-aminopropyltriethoxysilane, N-cyclohexylaminomethyltriethoxysilane, N-cyclohexylaminomethyldiethoxymethylsilane, N-phenylaminomethyltrimethoxysilane, (2-aminoethyl) aminomethyltrimethoxysilane, and N, N'-bis[3-(trimethoxysilyl)propyl]ethylenediamine; ketimine type silanes such as N-(1,3-dimethylbutylidene)-3-(triethoxysilyl)-1-propaneamine; mercapto group-containing silanes such as γ-mercaptopropyltrimethoxysilane, γ-mercaptopropyltriethoxysilane, γ-mercaptopropylmethyldimethoxysilane, γ-mercaptopropylmethyldiethoxysilane, mercaptomethyltrimethoxysilane, and mercaptomethyltriethoxysilane; epoxy group-containing silanes such as γ-glycidoxypropyltrimethoxysilane, γ-glycidoxypropyltriethoxysilane, γ-glycidoxypropylmethyldimethoxysilane, β-(3,4-epoxycyclohexyl)ethyltrimethoxysilane, and 3-(3,4-epoxycyclohexyl) ethyltriethoxysilane; carboxysilanes such as β-carboxyethyltriethoxysilane, β-carboxyethylphenylbis(2-methoxyethoxy)silane, and N-β-(carboxymethyl)aminoethyl-γ-aminopropyltrimethoxysilane; vinyl type unsaturated group-containing silanes such as vinyltrimethoxysilane, vinyltriethoxysilane, γ-methacryloyloxypropylmethyldimethoxysilane, γ-acryloyloxypropyltriethoxysilane, and methacryloyloxymethyltrimethoxysilane; halogen-containing silanes such as γ-chloropropyltrimethoxysilane; isocyanurate silanes such as tris(3-trimethoxysilylpropyl)isocyanurate, and the like. Additionally, derivatives prepared by modification of these compounds, such as amino-modified silyl polymers, silylated amino polymers, unsaturated aminosilane complexes, phenylamino long-chain alkylsilanes, aminosilylated silicones, silylated polyesters, and the like can also be used as the silane coupling agent. The reaction product of the silane coupling agent includes a reaction product of an aminosilane and an epoxysilane, a reaction product of an aminosilane and an isocyanatosilane, and a partial condensate of various kinds of silane coupling agents.

When the silane coupling agent is used, the amount used is preferably about 0.1 to 15 parts by mass, more preferably 0.5 to 10 parts by mass, and particularly preferably about 1 to 5 parts by mass per 100 parts by mass of the total amount of the polyol (A) and polyisocyanate (B). If the amount added is below this range, there are cases where the adhesiveness and storage stability of the curable resin composition are not sufficient. On the other hand, if the amount added exceeds this range, the strength of the cured product may decrease in some cases.

<Dehydrating Agent (E)>

If necessary, a dehydrating agent may be added as the component (E) to the curable resin composition of the present invention. Water present in the composition can be removed by the addition of a dehydrating agent, thereby improving storage stability and foaming at the time of curing. Specific examples of the dehydrating agent include vinyltrimethoxysilane, calcium oxide, zeolite, p-toluenesulfonyl isocyanate, and oxazolidines such as 3-ethyl-2- methyl-2-(3-methylbutyl)-1,3-oxazolidine and the like. These can be used alone or in combination of two or more thereof.

When the dehydrating agent is used, the amount used is preferably about 0.1 to 30 parts by mass, more preferably about 0.5 to 10 parts by mass, and particularly preferably about 1 to 5 parts by mass per 100 parts by mass of the total amount of the polyol component (A) and polyisocyanate component (B).

<Other Compounded Components>

In the present invention, it is possible to use other compounded components as needed. As the other compounded components, there are exemplified hydrolysis stabilizers, titanate-based coupling agents, aluminate-based coupling agents, release agents, antistatic agents, lubricants, low shrinkage agents, silicone surfactants, and the like.

<Production of Curable Resin Composition>

The curable resin composition of the present invention is a curable resin composition that mainly comprises a polyol component (A) and a polyisocyanate component (B) and contains polymer fine particles (C). Such a composition is preferably a composition in which polymer fine particles (C) are dispersed in the form of primary particles.

Various methods can be used as a method of obtaining a composition in which polymer fine particles (C) are dispersed in the state of primary particles in the component (A) or (B). For example, such a method includes a method of bringing polymer fine particles obtained in the state of an aqueous latex, into contact with the polyol component (A) and then removing unnecessary components such as water and the like, and a method of once extracting polymer fine particles with an organic solvent and then mixing the extract with the polyol component (A) to remove the organic solvent. However, it is preferred to use the method described in International Publication WO 2009/14037. Specifically, such a method includes a first step of mixing an aqueous latex containing polymer fine particles (C) (in particular, a reaction mixture after production of the polymer fine particles by emulsion polymerization) with an organic solvent having a solubility of 5% by mass or more and 40% by mass or less in water at 20° C. and further mixing the mixture with an excess of water to agglomerate the polymer fine particles; a second step of separating and collecting the agglomerated polymer fine particles (C) from the liquid phase and mixing the fine particles with an organic solvent again to obtain an organic solvent solution containing the polymer fine particles (C); and a third step of further mixing the organic solvent solution with the polyol component (A) and then distilling off the organic solvent, and this method is preferably used for the preparation of the composition.

The polyol component (A) that is a liquid at 23° C. is preferable because the third step is easily performed. The term "liquid at 23° C." means that the softening point is 23° C. or less and means that the polyol component (A) has a fluidity at 23° C.

Each component of the polyol component (A), the polyisocyanate component (B), the curing catalyst component (D) and the other compounded components as needed are further added to and mixed with the composition which has been obtained by the above steps and in which the polymer fine particles (C) are dispersed in the state of primary particles in the polyol component (A), so that the curable resin composition of the present invention in which the polymer fine particles (C) are dispersed in the state of primary particles, is obtained.

When each component is mixed, such mixing is performed in a known manner by using a mixer that is usually used, thereby producing the curable resin composition. The composition may be obtained by uniformly dispersing a variety of raw materials under reduced pressure if necessary, using a mixing vessel equipped with a stirring blade of a propeller-type/a paddle type, or a mixer such as a planetary mixer, a kneader, a Hobart mixer, a high speed mixer, a line mixer, a roll mill, a sand mill, an attritor, and a two-axis mixer. The viscosity of the mixture may be designed according to the application method.

<Two Pack Type Curable Resin Composition>

When the curable resin composition of the present invention is used as a two pack type or a multi-pack type, each component of the present invention is preferably stored as a first liquid containing an isocyanate group-containing component <polyisocyanate component (B) and/or an isocyanate group-containing urethane prepolymer obtained by reacting the polyol component (A) with the polyisocyanate component (B) at an equivalent ratio (NCO/active hydrogen-containing group) of more than 1> and as a second liquid containing a hydroxyl group-containing component <polyol component (A) and/or a hydroxyl group-containing urethane prepolymer obtained by reacting the polyol component (A) with the polyisocyanate component (B) at an equivalent ratio (NCO/active hydrogen-containing group) of less than 1, in a separate vessel, and is preferably used by mixing immediately before use. In this case, the polymer fine particle component (C), the curing catalyst component (D), and the other compounded components other than the polyol component (A), the polyisocyanate component (B) and the urethane prepolymer, may be added to the first liquid or the second liquid. From the viewpoint of storage stability, an embodiment of two pack type curable resin composition comprising the first liquid containing the polyisocyanate component (B) and the second liquid containing the polyol component (A), the polymer fine particle component (C), and the curing catalyst component (D) is also included in the present invention.

<Cured Material>

The present invention encompasses a cured material obtained by curing the curable resin composition. The cured material having the uniform dispersibility of the polymer fine particles can be easily obtained by curing the curable resin composition of the present invention having the dispersibility of the primary particle of the polymer fine particles. In addition, the cured material can be easily obtained because it is difficult for the polymer fine particles to swell and the viscosity of the curable resin composition is lower.

In the cured material, the glass transition temperature is preferably not less than 75° C., more preferably not less than 80° C., further preferably not less than 90° C., even more preferably not less than 100° C., and especially preferably not less than 110° C. The upper limit of the glass transition temperature is not particularly limited, and about 200° C. In the case of increasing the glass transition temperature, the number of the functional group of the polyether polyol may be increased. Preferably polyether polyol having three or more functional groups and more preferably polyether polyol having four functional groups is used. The amount of the polyether polyol having three or more functional groups is preferably not less than 20% by mass, more preferably not less than 30% by mass, further preferably not less than 40% by mass, even more preferably not less than 50% by mass per 100% by mass of polyol, and preferably not more than 100% by mass, more preferably not more than 99% by mass, further preferably not more than 98% by mass, even more preferably not more than 97% by mass. In the case of less than 20% by mass, the increase of the glass transition temperature may not be expected. The amount of the polyether polyol having four functional groups is preferably not less than 50% by mass, more preferably not less than 55% by mass, further preferably not less than 60% by mass, and preferably not more than 90% by mass, more preferably not more than 85% by mass, further preferably not more than 80% by mass per 100% by mass of the polyol. In the case of less than 50% by mass, the increase of the glass transition temperature may not be expected, and in the case of more than 90% by mass, the rigidity becomes high too much so that the toughness is lowered in some cases.

<Applications>

The curable resin composition of the present invention is preferably used for applications such as adhesives for structural adhesion, ink binders, wood chip binders, binders for rubber tip, foam chip binders, binders for casting, flooring materials, ceramics, solidifier for bedrock, automotive interior materials, general woodworking, furniture, interior, wall materials, and food packaging; coating materials; fiber-reinforced composite materials; and urethane foams for automotive sheets, automotive interior parts, sound-absorbing materials, damping materials, shock absorbers, thermal insulation materials, and flooring cushions for construction work.

Among them, particularly preferred embodiments of the present invention include a structural adhesive or a coating material formed by using the curable resin composition of the present invention and a fiber-reinforced composite material formed by using the curable resin composition of the present invention as a binder for reinforcing fibers because such a product from the curable resin composition of the present invention is excellent in toughness and adhesion while showing high rigidity and elastic modulus.

<Structural Adhesive>

The curable resin composition of the present invention has good adhesion to various adherends, such as cold rolled steel, aluminum, fiberglass reinforced polyester (FRP), panels of cured products of thermosetting resins such as carbon fiber-reinforced epoxy resins, carbon fiber-reinforced thermoplastic resin sheet panels, sheet molding compounds (SMC), ABS, PVC, polycarbonates, polypropylene, TPO, wood, and glass and the like.

The curable resin composition of the present invention exhibits an excellent adhesion property and flexibility not only at a low temperature (about −20° C.) to normal temperature, but also even at a high temperatures (about 80° C.). Thus, a urethane resin adhesive composition of the present embodiment can be preferably used as a structural adhesive.

Therefore, structural adhesives using the curable resin composition of the present invention can be used as an adhesive for structural members, such as automotives and vehicles (Shinkansen, trains), civil engineering, architecture, building materials, woodworking, electricity, electronics, aircraft, and space industries, etc. In particular, as the automotive-related application, it may include adhesion of interior materials such as ceilings, doors, seats, etc. and adhesion of exterior materials such as automobile illumination lighting fixture (e.g. lamp) and side molding.

<Coating Material>

When the curable resin composition of the present invention is used as a coating material, the viscosity of the mixture is generally set to about 500 to 9,000 cps/25° C. in the case of using trowels or rakes, and to about 100 to 3,000 cps/25° C. in the case of using rollers or sprays. When the curable resin composition of the present invention is applied to, for example, floor or corridor, a general construction method for urethane floor coating can be applied. For example, after applying a primer to the substrate which has been subjected to a base material adjustment, the curable resin composition of the present invention is uniformly coated using trowels, rollers, rakes, or spray guns, depending on the constructing conditions. After coating, curing proceeds to obtain a urethane paving film excellent in performance. Coating films obtained by curing the curable resin composition of the present invention are excellent in load resistance and abrasion resistance.

There is no particular limitation on the substrate at the time of coating with use of the curable resin composition of the present invention. Specific examples of the substrate include an inorganic substrate, such as concrete wall, concrete slab, concrete block, CMU (Concrete Masonry Unit), mortar board, ALC board, gypsum board (Dens Glass Gold: manufactured by Georgia Pacific Co., Ltd.) and slate board; a wood substrate, such as wood, plywood, and OSB (Oriented Strand Board); an organic substrate, such as asphalt, modified bitumen, waterproof sheet (e.g. EPDM, TPO, etc.), plastic, FRP, and urethane foam insulation material; and a metal substrate such as metal panel.

A laminate obtained by curing the curable resin composition of the present invention after its application to a metal substrate or a porous substrate is a coating film excellent in corrosion resistance to the substrate as well as in crack resistance and load resistance. Thus, such a laminate is included in the present invention as another aspect.

Although there is no particular limitation on the method of applying a coating material with use of the curable resin composition of the present invention, known coating methods are employed with use of trowel, rake, brush, roller, air spray, or airless spray.

Although there is no particular limitation on the use of coating materials using the curable resin composition of the present invention, such a coating material is used in automobiles, electric appliances, office machines, building materials, wood, coating floors, heavy anticorrosion, concrete anticorrosion, waterproofing membrane materials for rooftop/roof water proofing or corrosion resistance/underground waterproofing, electrodeposition coating materials, automobile repair, can coating, top coating, intermediate coating, undercoating, primers, highly weather-resistant coating materials, non-yellowing coating materials, and the like. When the coating material is used in coating floor materials or paving materials, it can be used in plant, laboratory, warehouse, and clean room.

<Fiber-Reinforced Composite Material>

When the curable resin composition of the present invention is used as a fiber-reinforced composite material, there is no particular limitation on the reinforcing fibers. However, the reinforcing fiber includes glass fibers, long glass fibers, carbon fibers, natural fibers, metal fibers, thermoplastic resin fibers, boron fibers, aramid fibers, polyethylene fibers, Zylon reinforcing fibers, and the like. In particular, glass fibers or carbon fibers are preferable.

There is no particular limitation on the molding method for a composite material using the curable resin composition of the present invention. However, such a method includes an autoclave molding method using a prepreg, a filament winding molding method, a hand lay-up molding method, a vacuum bag molding method, a resin transfer molding (RTM) method, a vacuum assisted resin transfer molding (VARTM) method, a pultrusion molding method, an injection molding method, a sheet winding molding method, a spray up method, BMC (Bulk Molding Compound) method, SMC (Sheet Molding Compound) method, and the like.

In particular, when the curable resin composition of the present invention is used for molding the carbon fiber-reinforced composite material, an autoclave molding method using a prepreg, a filament winding molding method, a hand lay-up molding method, a vacuum bag molding method, a resin transfer molding (RTM) method, and a vacuum assisted resin transfer molding (VARTM) method are preferable.

There is no particular limitation on the application of the composite material using the curable resin composition of the present invention, and such a composite material is used in aircraft, spacecraft, automobiles, bicycles, ships, weapons, windmills, sporting goods, containers, building materials, waterproof materials, printed circuit boards, electrically insulating materials, and the like.

More details of the reinforcing fibers, molding methods, molding conditions, compounding agents, and uses relating to a composite material using the curable resin composition of the present invention are described in US 2006/0173128 A, US 2012/0245286 A, Japanese Unexamined Patent Application Publication No. 2002-530445 (WO2000/029459), Japanese Unexamined Patent Application Publication No. Sho 55-157620 (U.S. Pat. No. 4,251,428), Japanese Unexamined Patent Application Publication No. 2013-504007 (WO 2011/028271), Japanese Unexamined Patent Application Publication No. 2007-125889 (US 2007/0098997 A), and Japanese Unexamined Patent Application Publication No. 2003-220661 (US 2003/0134085 A).

<Foam>

The foam obtained by foaming the curable resin composition of the present invention is also an aspect included in the present invention.

As described above, the foam may be manufactured by, for example, the method comprising reacting a polyol (A) in which polymer fine particles (C) are dispersed, with a polyisocyanate (B) in the presence of a curing catalyst, a foaming agent, and a foam stabilizer.

The foaming agent is not particularly limited, and a fluorocarbon-based foaming agent such as dichloromonofluoroethane and hydro fluorocarbon may also be used. However, from the viewpoint of environmental pollution, it is preferable to use water. Since water utilizes the carbon dioxide gas generated by the reaction with a polyisocyanate, there are no environmental problems.

The amount of the foaming agent used is in the range of usually 0.01 to 10 parts by mass, preferably in the range of 0.1 to 5 parts by mass per 100 parts by mass of the polyol component (A).

The foam stabilizer is not particularly limited as long as it is conventionally used. For example, silicone-based surfactants such as various siloxane-polyether block copolymers may be used.

The amount of the foam stabilizer used is usually 0.01 to 5 parts by mass, preferably 0.1 to 3 parts by mass per 100 parts by mass of the polyol component (A).

The present application claims the benefit of priority to Japanese Patent Application Number 2013-120388 filed on Jun. 7, 2013. The entire contents of the specification of Japanese Patent Application Number 2013-120388 filed on Jun. 7, 2013 are hereby incorporated by reference.

EXAMPLES

Next, the present invention will be described in detail with reference to Examples, but the present invention is not limited thereto, and the variation and the modification of the present invention without departing the gist described above and below are all included the technical scope of the present invention. In the following examples, "part (s)" and "%" mean "part (s) by mass" and "% by mass", respectively.

Evaluation Method

First, the evaluation method of the curable resin composition produced by Examples and Comparative Examples will be described below.

(1) Measurement of Volume Average Particle Diameter

The volume average particle diameter (Mv) of the polymer fine particles dispersed in an aqueous latex was measured using a Microtrac UPA150 (manufactured by Nikkiso Co., Ltd.). The dispersed polymer fine particles were diluted with deionized water and were used as a measurement sample. The measurement was carried out by inputting the refractive indexes of water and the respective refractive index of polymer fine particles, and adjusting the sample concentration in a range of a signal level of 0.6 to 0.8 for a measurement time of 600 seconds.

(2) Measurement of Bending Properties (Bending Modulus and Bending Strain at Maximum Bending Stress)

A test piece (length: 100 mm, width (b): 10 mm, thickness (h): 5 mm) was cut out from a cured plate sample, and aged at 23° C. Then, the sample was tested by a three-point bending test using an autograph AG-2000E (manufactured by Shimadzu Corporation) at a distance between support points (L) of 80 mm and a testing speed of 2 mm/min. The initial slope (F/e) of a load (F)-deflection (e) curve thus obtained was determined, and a bending modulus (E) was calculated using the following equation (1). In addition, the bending strain at the maximum bending stress (En) was calculated from the deflection at the maximum bending stress (em) according to the equation (2) below. In the equation, (F/e) is given in kN/mm, and L, b, h, and $e_{fM}$ are given in millimeters.

$$E(\text{GPa}) = L^3 \times (F/e)/(4 \times b \times h^3) \quad (1)$$

$$\varepsilon_{fM}(\%) = 600 \times e_{fM} \times h/L^2 \quad (2)$$

(3) Measurement of Fracture Toughness

A test piece (length: 2.5 inch, width (b): 0.5 inch., thickness (h): 5 mm) was cut out from a cured plate sample, and a V-shaped notch was formed on the test piece using a notching machine. Then, a crack extending from the tip of the V-shaped notch to the center of the test piece was formed with a razor blade. The test piece was aged at 23° C., and tested by a three-point bending test using an autograph, AG-2000E (manufactured by Shimadzu Corporation) at a distance (L) between support points of 50 mm and a testing speed of 1 mm/min. A fracture toughness K1c (MPa·m$^{1/2}$) was calculated using the maximum strength F (kN) determined by the bending test, according to the following equations (2) and (3). In the equations, "a" represents a sum of the depth of the V-shaped notch and the distance from the tip of the V-shaped notch to the crack front, and L, h, a, and b are given in centimeters.

$$K1c = (F \times L/h \times b^{3/2})) \times f \quad (2)$$

$$f = 3(a/b)^{1/2} \times AA/BB \quad (3)$$

$$AA = 1.99 - (a/b) \times \{1 - (a/b)\} \times \{2.15 - 3.93(a/b) + 2.7(a/b)^2\}$$

$$BB = 2\{1 + 2(a/b)\}\{1 - (a/b)\}^{3/2}$$

(4) Measurement of T-Peel Strength

According JIS K 6854, a curable resin composition was applied to between two cold-rolled steel plates (SPCC-SD) having a dimension of 25×200×0.5 mm, so that such two steel plates were bonded together to obtain an adhesive thickness of 250 μm. This was cured at 80° C. for 3 hours. Then, a test piece was subjected to a 180° peel test at 23° C. and a test speed of 254 mm/min, using an autograph AG-2000E (manufactured by Shimadzu Corporation).

(5) Dynamic Resistance to Peel (Impact-Resistant Peel Adhesion)

A curable resin composition was applied to between two cold-rolled steel plates (SPCC-SD) having a dimension of 20×90×0.8 mm, so that such two steel plates were bonded together to an adhesive thickness of 0.25 mm. This was cured at 80° C. for 3 hours and then a dynamic resistance to peel was measured at 23° C. according to ISO 11343.

1. Formation of Core Layer

Production Example 1-1; Preparation of Polybutadiene Rubber Latex (R-1)

A 100 L-pressure resistant polymerization reactor was charged with 200 parts by mass of deionized water, 0.03 parts by mass of tripotassium phosphate, 0.25 parts by mass of potassium dihydrogen phosphate, 0.002 parts by mass of disodium ethylenediaminetetraacetate (EDTA), 0.001 parts by mass of ferrous sulfate heptahydrate (Fe), and 1.5 parts by mass of sodium dodecylbenzenesulfonate (SDS), and the mixture was stirred while sufficiently purging with nitrogen to remove oxygen. Thereafter, 100 parts by mass of butadiene (BD) was introduced into the system, and the temperature was raised to 45° C. To the polymerization reactor were added 0.015 parts by mass of p-menthane hydroperoxide (PHP) and then 0.04 parts by mass of sodium formaldehyde sulfoxylate (SFS), thereby initiating polymerization. At four hours after the polymerization initiation, 0.01 parts by mass of PHP, 0.0015 parts by mass of EDTA, and 0.001 parts by mass of Fe were introduced thereto. After ten hours of polymerization, residual monomers were removed by devolatilization under reduced pressure to terminate the polymerization. Thus, a latex (R-1) that contains polybutadiene rubber particles was obtained. The polybutadiene rubber particles contained in the obtained latex had a volume average particle diameter of 0.10 μm.

Production Example 1-2; Preparation of Polybutadiene Rubber Latex (R-2)

A pressure resistant polymerization reactor was charged with 21 parts by mass of the polybutadiene rubber latex (R-1) obtained in Production Example 1-1 (containing 7 parts by mass of the polybutadiene rubber), 185 parts by mass of deionized water, 0.03 parts by mass of tripotassium phosphate, 0.002 parts by mass of EDTA, and 0.001 parts by mass of ferrous sulfate heptahydrate, and the mixture was stirred while sufficiently purging with nitrogen to remove oxygen. Thereafter, 93 parts by mass of butadiene (BD) was introduced into the system, and the temperature was raised to 45° C. To the polymerization reactor were added 0.02 parts by mass of PHP and then 0.10 parts by mass of SFS, thereby initiating polymerization. Every 3 hours from the start of polymerization up to 24 hours, 0.025 parts by mass of PHP, 0.0006 parts by mass of EDTA, and 0.003 parts by mass of ferrous sulfate heptahydrate were respectively fed into the polymerization reactor. After 30 hours of the polymerization, residual monomers were removed by devolatilization under reduced pressure to terminate the polymerization. Thus, a polybutadiene rubber latex (R-2) that contained a polybutadiene rubber as a main component was obtained. The polybutadiene rubber particles contained in the obtained latex had a volume average particle diameter of 0.20 μm.

2. Preparation of Polymer Fine Particles (Formation of Shell Layer)

Production Example 2-1; Preparation of Core-Shell Polymer Latex (L-1)

A 3 L glass container was charged with 1575 parts by mass (corresponding to 510 parts by mass of polybutadiene rubber particles) of the latex (R-1) obtained in Production Example 1-1 and 315 parts by mass of deionized water, and the mixture was stirred at 60° C. while purging with nitrogen. After 0.024 parts by mass of EDTA, 0.006 parts by mass of Fe, and 1.2 parts by mass of SFS were added, a mixture of a graft monomer (60 parts by mass of methyl methacrylate (MMA) and 30 parts by mass of 4-hydroxybutyl acrylate (4HBA)) and 0.3 parts by mass of cumene hydroperoxide (CHP) was continuously added thereto over a period of 2 hours to carry out graft polymerization. After completion of the addition, the mixture was stirred for further 2 hours to finish the reaction, thereby obtaining a latex (L-1) of a core-shell polymer (C-1). The volume average particle diameter of the core-shell polymer contained in the obtained latex was 0.11 μm.

Production Example 2-2; Preparation of Core-Shell Polymer Latex (L-2)

To a glass reactor equipped with a thermometer, a stirrer, a reflux condenser, a nitrogen inlet, and a monomer addition device were fed 240 parts by mass (containing 80 parts by mass of polybutadiene rubber particles) of the polybutadiene rubber latex (R-2) obtained in Production Example 1-2 and 57 parts by mass of deionized water, and the mixture was stirred at 60° C. while purging with nitrogen. After addition of 0.004 parts by mass of EDTA, 0.001 parts by mass of ferrous sulfate heptahydrate and 0.2 parts by mass of SFS, a mixture of 18 parts by mass of MMA, 2 parts by mass of styrene (ST), and 0.06 parts by mass of CHP was continuously added thereto over a period of 85 minutes. After completion of the addition, 0.04 parts by mass of CHP was added and stirring was continued for further 1 hour to complete the polymerization to obtain an aqueous latex (L-2) containing a core-shell polymer (C-2). The polymerization conversion ratio of the monomer components was 99% or more. The volume average particle diameter of the core-shell polymer contained in the obtained aqueous latex was 0.21 μm.

Production Example 2-3; Preparation of Core-Shell Polymer Latex (L-3)

The latex (L-3) of the core-shell polymer (C-3) was prepared in the same manner as Production Example 2-2 except that MMA 17.5 parts by mass, styrene (ST) 2 parts by mass, 4HBT 0.5 parts by mass were used in place of MMA 18 parts by mass, ST 2 parts by mass as graft monomers. The volume average particle diameter of the core-shell polymer contained in the obtained aqueous latex was 0.21 μm.

Production Example 2-4; Preparation of Core-Shell Polymer Latex (L-4)

The latex (L-4) of the core-shell polymer (C-4) was prepared in the same manner as Production Example 2-2 except that MMA 17 parts by mass, ST 2 parts by mass, 4HBT 1 part by mass were used in place of MMA 18 parts by mass, ST 2 parts by mass as graft monomers. The volume average particle diameter of the core-shell polymer contained in the obtained aqueous latex was 0.21 µm.

Production Example 2-5; Preparation of Core-Shell Polymer Latex (L-5)

The latex (L-5) of the core-shell polymer (C-5) was prepared in the same manner as Production Example 2-2 except that MMA 16 parts by mass, ST 2 parts by mass, 4HBT 2 parts by mass were used in place of MMA 18 parts by mass, ST 2 parts by mass as graft monomers. The volume average particle diameter of the core-shell polymer contained in the obtained aqueous latex was 0.21 µm.

Production Example 2-6; Preparation of Core-Shell Polymer Latex (L-6)

The latex (L-6) of the core-shell polymer (C-6) was prepared in the same manner as Production Example 2-2 except that MMA 14 parts by mass, ST 2 parts by mass, 4HBT 4 parts by mass were used in place of MMA 18 parts by mass, ST 2 parts by mass as graft monomers. The volume average particle diameter of the core-shell polymer contained in the obtained aqueous latex was 0.21 µm.

3. Preparation of Dispersion of Polymer Fine Particles (C) Dispersed in Curable Resin Production Example 3-1; Preparation of Dispersion (M-1)

Methyl ethyl ketone (MEK) (132 g) was introduced into a 1 L mixing tank at 25° C., and 132 g (corresponding to 40 g of polymer fine particles) of the aqueous latex (L-1) of the core-shell polymer (C-1) obtained in Production Example 2-1 was charged with stirring. After uniformly mixing, 200 g of water was charged at a feed rate of 80 g/min. After completion of the supply, stirring was stopped immediately to obtain floatable aggregates and a slurry liquid containing aqueous phase containing a portion of organic solvent. Then, leaving the agglomerates containing a portion of the aqueous phase, 360 g of the aqueous phase was discharged from the discharging port of the tank bottom. MEK (90 g) was added to the resulting agglomerates, and uniformly mixed to obtain a dispersion in which a core-shell polymer was uniformly dispersed. This dispersion was mixed with 80 g of a trifunctional polyether polyol PPT300 (A-1: Actcol T-300, manufactured by Mitsui Chemicals, Inc.) as the polyol component (A). MEK was removed from this mixture with a rotary evaporator. Thus, dispersion (M-1) in which polymer fine particles were dispersed in the polyol component (A) was obtained.

Production Example 3-2; Preparation of Dispersion (M-2)

Production Example 3-2 was conducted in the same manner as Production Example 3-1 except that two functional polyether polyol PPG 1000 (A-2: Actcol D-1000, manufactured by Mitsui Chemicals, Inc.) was used in place of PPT 300 (A-1). Dispersion (M-2) in which polymer fine particles were dispersed in the polyol component (A) was obtained.

Production Example 3-3; Preparation of Dispersion (M-3)

Production Example 3-3 was conducted in the same manner as Production Example 3-1 except that two functional polyether polyol PPG 400 (A-3: Actcol D-400, manufactured by Mitsui Chemicals, Inc.) was used in place of PPT 300 (A-1). Dispersion (M-3) in which polymer fine particles were dispersed in the polyol component (A) was obtained.

Production Examples 3-4 to 3-8; Preparation of Dispersions (M-4 to M-8)

Methyl ethyl ketone (MEK) (132 g) was introduced into a 1 L mixing tank at 25° C., and 132 g (corresponding to 40 g of polymer fine particles) of each of aqueous latexes (L-2 to L-6) of the core-shell polymers (C-2 to C-6) obtained respectively in Production Examples 2-2 to 2-6 was charged with stirring. After uniformly mixing, 200 g of water was charged at a feed rate of 80 g/min. After completion of the supply, stirring was stopped immediately to obtain floatable aggregates and a slurry liquid containing aqueous phase containing a portion of organic solvent. Then, leaving the agglomerates containing a portion of the aqueous phase, 360 g of the aqueous phase was discharged from the discharging port of the tank bottom. MEK (90 g) was added to the resulting agglomerates, and uniformly mixed to obtain a dispersion in which a core-shell polymer was uniformly dispersed. This dispersion was mixed with 80 g of a polyester polyol (A-6: Desmophen 1200, hydroxyl content 5.0%, manufactured by Bayer AG) as the polyol component (A). MEK was removed from this mixture with a rotary evaporator. Thus, dispersions (M-4 to M-8) in which polymer fine particles were dispersed in the polyol component (A) were obtained.

Examples 1 to 2 and Comparative Examples 1 to 4

According to the formulations shown in Table 1, PPT300 (A-1) or PPG100 (A-2) as the polyol component (A), the dispersions (M-1 to M-2) obtained in Production Examples 3-1 to 3-2, isophorone diisocyanate (B-1: manufactured by Wako Pure Chemical Industries, Ltd.) as the polyisocyanate component (B), an octylic acid salt of DBU (U-CAT SA102, manufactured by San-Apro Ltd.) as the curing catalyst component (D), and powdery synthetic zeolite A-3 (200 mesh passing material: manufactured by Wako Pure Chemical Industries, Ltd.) as the dehydrating agent were respectively weighed, and mixed well to be defoamed to obtain a curable resin composition. It is to be noted that the ratio ($\beta/\alpha$) of the total molar amount ($\beta$) of isocyanate groups of the polyisocyanate component (B) to the total molar amount ($\alpha$) of hydroxyl groups in the polyol component (A) in the composition of Table 1 are all 1.0. Each composition in Table 1 was poured into between two Teflon (registered trademark)-coated steel plates sandwiching a spacer of 5 mm in thickness, and cured in a hot air oven at 80° C. for 3 hours, thereby obtaining a cured plate having a thickness of 5 mm. Since the curing plates of Examples 1 and 2 and Comparative Examples 1 and 2 were hard cured plates, the bending strain at maximum bending stress and the fracture toughness K1c were measured in accordance with the test method using this cured plate. The test results are shown in Table 1. It is to be noted that in Example 2 and Comparative Example 2, an unstable fracture did not occur during the measurement of fracture toughness, and the valid K1c values were not obtained. Meanwhile, since the cured plates of Comparative Examples 3 and 4 were soft cured plates, bending properties and fracture toughness could not be measured. Then, No. 3 dumbbell specimens in accordance with JIS K 6251 were collected from the cured plates and subjected to a tensile test at 23° C. and at a rate of 500 mm/min, to measure the elongation at maximum tensile stress at that time. The test results are shown in Table 1.

TABLE 1

| | Composition | | Example 1 | Example 2 | Comparative Example 1 |
|---|---|---|---|---|---|
| Preparation containing polyol(A) | A-1 | Polyether polyol; three functional groups; hydroxyl value 530 mgKOH/g | 18.5 parts | 14.5 parts | 43.4 parts |
| | A-2 | Polyether polyol; two functional groups; hydroxyl value 110 mgKOH/g | | 13.6 parts | |
| | | Average hydroxyl value of polyol (A) mgKOH/g | 530 | 324 | 530 |
| Polyisocyanate(B) | B-1 | isophorone diisocyanate | 40.5 parts | 30.9 parts | 45.6 parts |
| Dispersion of polymer particles (C) | M-1 | Dispersion of polymer particles in which core-shell polymer C-1 is dispersed in polyol A-1 | 30 parts(10 parts of C-1 and 20 parts of A-1) | 15 parts(5 parts of C-1 and 10 parts of A-1) | |
| | M-2 | Dispersion of polymer particles in which core-shell polymer C-1 is dispersed in polyol A-2 | | 15 parts(5 parts of C-1 and 10 parts of A-2) | |
| Curing catalyst (D) | | Octylic acid salt of 1,8-Diazabicyclo[5.4.0]undecene | 1.0 part | 1.0 part | 1.0 part |
| Dehydrating agent (E) | | Synthetic zeolite | 10.0 parts | 10.0 parts | 10.0 parts |
| Amount of component (A) per total amount | | | 38.5 (%) | 48.1 (%) | 43.4 (%) |
| Amount of component (B) per total amount | | | 40.5 (%) | 30.9 (%) | 45.6 (%) |
| Amount of {component (A) + component (B)} per total amount | | | 79.0 (%) | 79.0 (%) | 89.0 (%) |
| Amount of component (C) per total amount | | | 10.0 (%) | 10.0 (%) | 0 (%) |
| Amount of component (B) per 100 parts of component (A) | | | 105 parts | 64 parts | 105 parts |
| Amount of component (C) per 100 parts of total amount of component (A) and component (B) | | | 13 parts | 13 parts | — |
| Amount of component (D) per 100 parts of total amount of component (A) and component (B) | | | 1.3 parts | 1.3 parts | 1.3 parts |
| Amount of component (E) per 100 parts of total amount of component (A) and component (B) | | | 12.7 parts | 12.7 parts | 12.7 parts |
| Amount of component (A) having three or more functional groups per 100 parts of total amount of component (A) | | | 100 parts | 51 parts | 100 parts |
| Ratio ($\beta/\alpha$) of total molar amount ($\beta$) of isocyanate group of component (B) to total molar amount ($\alpha$) of hydroxyl group of component (A) | | | 1.0 | 1.0 | 1.0 |
| Bending strain at maximum bending stress | | % | 4.8 | 6.0 | 3.8 |
| Elongation at maximum tensile stress | | % | — | — | — |
| Fracture toughness K1C | | MPa·m$^{1/2}$ | 1.89 | — | 1.72 |

| | Composition | | Comparative Example 2 | Comparative Example 3 | Comparative Example 4 |
|---|---|---|---|---|---|
| Preparation containing polyol(A) | A-1 | Polyether polyol; three functional groups; hydroxyl value 530 mgKOH/g | 27.6 parts | 11.2 parts | 10 parts |
| | A-2 | Polyether polyol; two functional groups; hydroxyl value 110 mgKOH/g | 26.6 parts | 54.2 parts | 28.1 parts |
| | | Average hydroxyl value of polyol (A) mgKOH/g | 324 | 182 | 182 |
| Polyisocyanate(B) | B-1 | isophorone diisocyanate | 34.8 parts | 23.6 parts | 20.9 parts |
| Dispersion of polymer particles (C) | M-1 | Dispersion of polymer particles in which core-shell polymer C-1 is dispersed in polyol A-1 | | | |
| | M-2 | Dispersion of polymer particles in which core-shell polymer C-1 is dispersed in polyol A-2 | | | 30 parts(10 parts of C-1 and 20 parts of A-2) |
| Curing catalyst (D) | | Octylic acid salt of 1,8-Diazabicyclo[5.4.0]undecene | 1.0 part | 1.0 part | 1.0 part |
| Dehydrating agent (E) | | Synthetic zeolite | 10.0 parts | 10.0 parts | 10.0 parts |
| Amount of component (A) per total amount | | | 54.2 (%) | 65.4 (%) | 58.1 (%) |
| Amount of component (B) per total amount | | | 34.8 (%) | 23.6 (%) | 20.9 (%) |
| Amount of {component (A) + component (B)} per total amount | | | 89.0 (%) | 89.0 (%) | 79.0 (%) |
| Amount of component (C) per total amount | | | 0 (%) | 0 (%) | 10.0 (%) |
| Amount of component (B) per 100 parts of component (A) | | | 64 parts | 36 parts | 36 parts |
| Amount of component (C) per 100 parts of total amount of component (A) and component (B) | | | — | — | 13 parts |
| Amount of component (D) per 100 parts of total amount of component (A) and component (B) | | | 1.1 parts | 1.1 parts | 1.3 parts |
| Amount of component (E) per 100 parts of total amount of component (A) and component (B) | | | 11.2 parts | 11.2 parts | 12.7 parts |
| Amount of component (A) having three or more functional groups per 100 parts of total amount of component (A) | | | 51 parts | 17 parts | 17 parts |
| Ratio ($\beta/\alpha$) of total molar amount ($\beta$) of isocyanate group of component (B) to total molar amount ($\alpha$) of hydroxyl group of component (A) | | | 1.0 | 1.0 | 1.0 |
| Bending strain at maximum bending stress | | % | 5.6 | — | — |
| Elongation at maximum tensile stress | | % | — | 235 | 200 |
| Fracture toughness K1C | | MPa·m$^{1/2}$ | — | — | — |

C-1: core part/shell part = polybutadiene/methylmethacrylate, 4-hydroxylbutylacrylate = 510/60/30

From results of Table 1, the cured product obtained by curing the curable resin composition of the present invention exhibits an excellent fracture toughness. In addition, high ductility and high elongation properties are exhibited when a polyether polyol (a1) having a specific average hydroxyl value, a polyisocyanate (B) and polymer fine particles (C) are combined based on the values of the bending strain and tensile elongation.

Examples 3 to 6 and Comparative Examples 5 to 8

According to the formulations shown in Table 2, a trifunctional polyether polyol PPT300 (A-1: Actcol T-300, manufactured by Mitsui Chemicals, Inc.) as the polyol component (A), a bifunctional polyether polyol PPG400 (A-3: Actcol D-400, manufactured by Mitsui Chemicals, Inc.) as the polyol component (A), a bifunctional polyether polyol PPG200 (A-4: SANNIX PP-200, manufactured by Sanyo Chemical Industries, Ltd.) as the polyol component (A), a tetrafunctional polyetherpolyol PPQ (A-5: SANNIX HD-402, manufactured by Sanyo Chemical Industries, Ltd.) as the polyol component (A), and the dispersant (M-1 or M-3) obtained in Production Example 3-1 or Production Example 3-3 were mixed to prepare a mixed liquid. The mixed liquid was dried by injecting dry nitrogen therein for 1 hour while heating to and maintaining at 60° C., or by adding a dehydrating agent (powdery synthetic zeolite A-3 (200 mesh passing material: Wako Pure Chemical Industries, Ltd.). In the case of using a dehydrating agent, the dehydrating agent was used in the next step without its removal. Subsequently, the resulting mixed liquid was mixed well with a polymeric MDI (B-2: COSMONATE M-200, manufactured by Mitsui Chemicals, Inc.) as the polyisocyanate component (B) and optionally a defoaming agent (BYK (registered trademark)-A500, manufactured by BYK-Chemie GmbH.) and defoamed to obtain a curable resin composition. It is to be noted that the ratio (β/α) of the total molar amount (β) of isocyanate groups of the polyisocyanate component (B) and the total molar amount (α) of hydroxyl groups in the polyol component (A) in the composition of Table 2 are all 1.1. This composition was poured into between two Teflon (registered trademark)-coated steel plates sandwiching a spacer of 5 mm in thickness, and cured in a hot air oven at 130° C. for 3 hours, thereby obtaining a cured plate having a thickness of 5 mm. The bending modulus and the fracture toughness K1c were measured in accordance with the aforementioned test method using this cured plate. Also, the glass transition temperature of the cured plate was measured by DSC (differential scanning calorimeter). The test results are shown in Table 2.

TABLE 2

| Composition | | | Example 3 | Comparative Example 5 | Example 4 | Comparative Example 6 |
|---|---|---|---|---|---|---|
| Preparation containing polyol(A) | A-1 | Polyether polyol; three functional groups; hydroxyl value 530 mgKOH/g | | | 11.0 parts | 11.4 parts |
| | A-3 | Polyether polyol; two functional groups; hydroxyl value 270 mgKOH/g | 15.4 parts | 23.5 parts | 9.3 parts | 17.1 parts |
| | A-4 | Polyether polyol; two functional groups; hydroxyl value 570 mgKOH/g | 22.6 parts | 23.5 parts | 16.5 parts | 17.1 parts |
| | A-5 | Polyether polyol; four functional groups; hydroxyl value 422 mgKOH/g | | | | |
| | | Average hydroxyl value of polyol (A) mgKOH/g | 420 | 420 | 448 | 448 |
| Polyisocyanate(B) | B-2 | Polymethylenepolyphenylpolyisocyanate | 51.2 parts | 53.0 parts | 52.4 parts | 54.4 parts |
| Dispersion of polymer particles (C) | M-1 | Dispersion of polymer particles in which core-shell polymer C-1 is dispersed in polyol A-1 | | | | |
| | M-3 | Dispersion of polymer particles in which core-shell polymer C-1 is dispersed in polyol A-3 | 10.8 parts (3.6 parts of C-1 and 7.2 parts of A-3) | | 10.8 parts(3.6 parts of C-1 and 7.2 parts of A-3) | |
| Dehydrating agent (E) | | Synthetic zeolite | | | | |
| Deforming agent | | BYK-A500 | | | | |
| | | Amount of component (A) per total amount | 45.2 (%) | 47.0 (%) | 44.0 (%) | 45.6 (%) |
| | | Amount of component (B) per total amount | 51.2 (%) | 53.0 (%) | 52.4 (%) | 54.4 (%) |
| | | Amount of {component (A) + component (B)} per total amount | 96.4 (%) | 100.0 (%) | 96.4 (%) | 100.0 (%) |
| | | Amount of component (C) per total amount | 3.6 (%) | 0 (%) | 3.6 (%) | 0 (%) |
| | | Amount of component (B) per 100 parts of component (A) | 113 parts | 113 parts | 119 parts | 119 parts |
| | | Amount of component (C) per 100 parts of total amount of component (A) and component (B) | 3.7 parts | — | 3.7 parts | — |
| | | Amount of component (E) per 100 parts of total amount of component (A) and component (B) | — | — | — | — |
| | | Amount of component (A) having three or more functional groups per 100 parts of total amount of component (A) | 0 parts | 0 parts | 25 parts | 25 parts |
| | | Ratio (β/α) of total molar amount (β) of isocyanate group of component (B) to total molar amount (α) of hydroxyl group of component (A) | 1.1 | 1.1 | 1.1 | 1.1 |
| Glass transition temperature | | ° C. | 78 | 78 | 90 | 89 |
| Bending modulus | | GPa | 2.3 | 2.5 | 2.6 | 2.7 |
| Fracture toughnessK1C | | MPa·m$^{1/2}$ | 3.06 | 2.30 | 2.76 | 1.58 |

| Composition | | | Example 5 | Comparative Example 7 | Example 6 | Comparative Example 8 |
|---|---|---|---|---|---|---|
| Preparation containing polyol(A) | A-1 | Polyether polyol; three functional groups; hydroxyl value 530 mgKOH/g | 14.2 parts | 22.2 parts | 7.7 parts | 11.0 parts |
| | A-3 | Polyether polyol; two functional groups; hydroxyl value 270 mgKOH/g | 10.7 parts | 11.1 parts | | |

TABLE 2-continued

|  |  |  | | | | |
|---|---|---|---|---|---|---|
| | A-4 | Polyether polyol; two functional groups; hydroxyl value 570 mgKOH/g | 10.7 parts | 11.1 parts | 2.2 parts | 2.2 parts |
| | A-5 | Polyether polyol; four functional groups; hydroxyl value 422 mgKOH/g | | | 30.2 parts | 30.7 parts |
| | | Average hydroxyl value of polyol (A) mgKOH/g | 475 | 475 | 456 | 456 |
| Polyisocyanate(B) | B-2 | Polymethylenepolyphenylpolyisocyanate | 53.7 parts | 55.6 parts | 53.0 parts | 53.7 parts |
| Dispersion of polymer particles (C) | M-1 | Dispersion of polymer particles in which core-shell polymer C-1 is dispersed in polyol A-1 | 10.7 parts(3.57 parts of C-1 and 7.13 parts of A-1) | | 4.5 parts(1.5 parts of C-1 and 3.0 parts of A-1) | |
| | M-3 | Dispersion of polymer particles in which core-shell polymer C-1 is dispersed in polyol A-3 | | | | |
| Dehydrating agent (E) | | Synthetic zeolite | | | 2.2 parts | 2.2 parts |
| Deforming agent | | BYK-A500 | | | 0.2 parts | 0.2 parts |
| Amount of component (A) per total amount | | | 42.7 (%) | 44.4 (%) | 43.1 (%) | 43.9 (%) |
| Amount of component (B) per total amount | | | 53.7 (%) | 55.6 (%) | 53.0 (%) | 53.7 (%) |
| Amount of {component (A) + component (B)} per total amount | | | 96.4 (%) | 100.0 (%) | 96.1 (%) | 97.6 (%) |
| Amount of component (C) per total amount | | | 3.6 (%) | 0 (%) | 1.5 (%) | 0 (%) |
| Amount of component (B) per 100 parts of component (A) | | | 126 parts | 125 parts | 123 parts | 122 parts |
| Amount of component (C) per 100 parts of total amount of component (A) and component (B) | | | 3.7 parts | — | 1.6 parts | — |
| Amount of component (E) per 100 parts of total amount of component (A) and component (B) | | | — | — | 2.3 parts | 2.3 parts |
| Amount of component (A) having three or more functional groups per 100 parts of total amount of component (A) | | | 50 parts | 50 parts | 95 parts | 95 parts |
| Ratio ($\beta/\alpha$) of total molar amount ($\beta$) of isocyanate group of component (B) to total molar amount ($\alpha$) of hydroxyl group of component (A) | | | 1.1 | 1.1 | 1.1 | 1.1 |
| Glass transition temperature | | ° C. | 100 | 100 | 120 | 120 |
| Bending modulus | | GPa | 2.6 | 2.8 | 2.7 | 2.7 |
| Fracture toughnessK1C | | MPa · m$^{1/2}$ | 2.73 | 1.51 | 1.95 | 1.10 |

C-1: core part/shell part = polybutadiene/methylmethacrylate, 4-hydroxylbutylacrylate = 510/60/30

From result of Table 2, the curable resin composition of the present invention has a high elastic modulus (high rigidity) and exhibits an excellent fracture toughness. In the case of using an aromatic polyisocyanate having a cyclic structure as the polyisocyanate component (B), its combination with the polymer fine particles (C) exhibits a remarkable improvement effect on the fracture toughness. Also, when the content of polyfunctional polyols such as trifunctional or higher-functional polyols among the polyol components (A) is large, high heat resistance (high glass transition temperature) is obtained. Further, when the content of the polyfunctional polyols such as trifunctional or higher-functional polyols of the components (A) is large, its effect of improving fracture toughness in combination with the polymer fine particles (C) is remarkable.

Example 7 and Comparative Example 9

According to the formulations shown in Table 3, a trifunctional polyether polyol PPT300 (A-1: Actcol T-300, manufactured by Mitsui Chemicals, Inc.) as the polyol component (A), a bifunctional polyether polyol PPG400 (A-3: Actcol D-400, manufactured by Mitsui Chemicals, Inc.) as the polyol component (A), a bifunctional polyether polyol PPG200 (A-4: SANNIX PP-200, manufactured by Sanyo Chemical Industries, Ltd.) as the polyol component (A), and the dispersant (M-1) obtained in Production Example 3-1 were mixed to prepare a mixed liquid. The mixed liquid was mixed by adding a dehydrating agent (powdery synthetic zeolite A-3 (200 mesh passing material: Wako Pure Chemical Industries, Ltd.)) and a filler (silica, crystallite C manufactured by Tatsumori Ltd.). In the case of using a dehydrating agent, the dehydrating agent was used in the next step without its removal. Subsequently, the resulting mixed liquid was mixed well with a polymeric MDI (B-2: COSMONATE M-200, manufactured by Mitsui Chemicals, Inc.) as the polyisocyanate component (B) and defoamed to obtain a curable resin composition. It is to be noted that the ratio ($\beta/\alpha$) of the total molar amount ($\beta$) of isocyanate groups of the polyisocyanate component (B) and the total molar amount ($\alpha$) of hydroxyl groups in the polyol component (A) in the composition of Table 3 are all 1.1. This composition was poured into between two Teflon (registered trademark)-coated steel plates sandwiching a spacer of 5 mm in thickness, and cured in a hot air oven at 110° C. for 3 hours, thereby obtaining a cured plate having a thickness of 5 mm. Also, the glass transition temperature, the bending modulus and the fracture toughness K1c of the cured plate were measured according to the above test methods. The test results are shown in Table 3.

TABLE 3

| | | Composition | Example 7 | Comparative Example 9 |
|---|---|---|---|---|
| Preparation containing polyol(A) | A-1 | Polyether polyol; three functional groups; hydroxyl value 530 mgKOH/g | 11.1 parts | 17.4 parts |
| | A-3 | Polyether polyol; two functional groups; hydroxyl value 570 mgKOH/g | 8.4 parts | 8.7 parts |
| | A-4 | Polyether polyol; two functional groups; hydroxyl value 270 mgKOH/g | 8.4 parts | 8.7 parts |
| | | Average hydroxyl value of polyol (A) mgKOH/g | 475 | 475 |

TABLE 3-continued

|  | Composition |  | Example 7 | Comparative Example 9 |
|---|---|---|---|---|
| Polyisocyanate(B) | B-2 | Polymethylenepolyphenylpolyisocyanate | 42.0 parts | 43.5 parts |
| Dispersion of polymer particles (C) | M-1 | Dispersion of polymer particles in which core-shell polymer C-1 is dispersed in polyol A-1 | 8.4 parts(2.8 parts of C-1 and 5.6 parts of A-1) |  |
| Dehydrating agent (E) |  | Synthetic zeoliteA-3 | 1.7 parts | 1.7 parts |
| Filler |  | Silica | 20.0 parts | 20.0 parts |
|  | Amount of component (A) per total amount |  | 33.5 (%) | 34.8 (%) |
|  | Amount of component (B) per total amount |  | 42.0 (%) | 43.5 (%) |
| Amount of {component (A) + component (B)} per total amount |  |  | 75.5 (%) | 78.3 (%) |
| Amount of component (C) per total amount |  |  | 28 (%) | 0 (%) |
| Amount of component (B) per 100 parts of component (A) |  |  | 125 parts | 125 parts |
| Amount of component (C) per 100 parts of total amount of component (A) and component (B) |  |  | 3.7 parts | — |
| Amount of component (E) per 100 parts of total amount of component (A) and component (B) |  |  | 2.3 parts | 2.2 parts |
| Amount of component (A) having three or more functional groups per 100 parts of total amount of component (A) |  |  | 50 parts | 50 parts |
| Ratio (β/α) of total molar amount (β) of isocyanate group of component (B) to total molar amount (α) of hydroxyl group of component (A) |  |  | 1.1 | 1.1 |
| Glass transition temperature |  | ° C. | 100 | 100 |
| Bending modulus |  | GPa | 3.5 | 3.7 |
| Fracture toughness K1C |  | MPa·$m^{1/2}$ | 3.48 | 2.51 |

C-1: core part/shell part = polybutadiene/methylmethacrylate, 4-hydroxylbutylacrylate = 510/60/30

From results of Table 3, the curable resin composition of the present invention has a high elastic modulus (high rigidity) and exhibits an excellent fracture toughness.

Example 8 and Comparative Example 10

According to the formulations shown in Table 4, a trifunctional polyether polyol PPT300 (A-1: Actcol T-300, manufactured by Mitsui Chemicals, Inc.) as the polyol component (A), a bifunctional polyether polyol PPG400 (A-3: Actcol D-400, manufactured by Mitsui Chemicals, Inc.) as the polyol component (A), a bifunctional polyether polyol PPG200 (A-4: SANNIX PP-200, manufactured by Sanyo Chemical Industries, Ltd.) as the polyol component (A), and the dispersant (M-1) obtained in Production Example 3-1 were mixed to prepare a mixed liquid. The mixed liquid was dried by injecting dry nitrogen thereto for 1 hour while heating to and maintaining at 60° C. Subsequently, water as a foaming agent, a silicone-based surfactant as a foam stabilizer (SH193, manufactured by Dow Corning Toray Co., Ltd.), a polymeric MDI (B-2: COSMONATE M-200, manufactured by Mitsui Chemicals, Inc.) as the polyisocyanate component (B), and a 1,4-diazabicyclo [2,3,2]octane solution (DABCO 33-LV, manufactured by Sigma-Aldrich Co., LLC.) as the curing catalyst (D) were added to the resulting mixture and mixed well to obtain a curable resin composition. It is to be noted that the ratio (β/α) of the total molar amount (β) of isocyanate groups of the polyisocyanate component (B) and the total molar amount (α) of hydroxyl groups of the polyol component (A) in the composition of Table 4 are all 1.1. Subsequently, the composition was poured into a mold made of Teflon (registered trademark)-coated steel plate that is controlled at 40° C., to obtain a foamed molded body having a thickness of 5 mm. The molding density was measured from the weight and apparent volume of this foamed molding body, and the specific gravity of non-foamed molding body. Also, according to JIS K7111-1, the Charpy strength was measured using the foamed molding body. The test results are shown in Table 4.

TABLE 4

|  | Composition |  | Example 8 | Comparative Example 10 |
|---|---|---|---|---|
| Preparation containing polyol(A) | A-1 | Polyether polyol; three functional groups; hydroxyl value 530 mgKOH/g | 18.0 parts | 22.0 parts |
|  | A-3 | Polyether polyol; two functional groups; hydroxyl value 570 mgKOH/g | 10.8 parts | 11.1 parts |
|  | A-4 | Polyether polyol; two functional groups; hydroxyl value 270 mgKOH/g | 10.8 parts | 11.1 parts |
|  |  | Average hydroxyl value of polyol (A) mgKOH/g | 475 | 475 |
| Polyisocyanate(B) | B-2 | Polymethylenepolyphenylpolyisocyanate | 54.2 parts | 55.1 parts |
| Dispersion of polymer particles (C) | M-1 | Dispersion of polymer particles in which core-shell polymer C-1 is dispersed in polyol A-1 | 5.5 parts(1.83 parts of C-1 and 3.67 parts of A-1) |  |
| Curing catalyst (D) |  | 1,4-diazabicyclo [2,3,2] octane | 0.4 parts | 0.4 parts |
| Forming agent |  | Water | 0.1 parts | 0.1 parts |
| Foam stabilizer |  | Silicone surfactant | 0.2 parts | 0.2 parts |
|  | Amount of component (A) per total amount |  | 43.3 (%) | 44.2 (%) |
|  | Amount of component (B) per total amount |  | 54.2 (%) | 55.1 (%) |
| Amount of {component (A) + component (B)} per total amount |  |  | 97.5 (%) | 99.3 (%) |
| Amount of component (C) per total amount |  |  | 1.8 (%) | 0 (%) |
| Amount of component (B) per 100 parts of component (A) |  |  | 125 parts | 125 parts |
| Amount of component (C) per 100 parts of total amount of component (A) and component (B) |  |  | 1.9 parts | — |

TABLE 4-continued

| Composition | | Example 8 | Comparative Example 10 |
|---|---|---|---|
| Amount of component (D) per 100 parts of total amount of component (A) and component (B) | | 0.4 parts | 0.4 parts |
| Amount of component (A) having three or more functional groups per 100 parts of total amount of component (A) | | 50 parts | 50 parts |
| ratio (β/α) of total molar amount (β) of isocyanate group of component (B) to total molar amount (α) of hydroxyl group of component (A) | | 1.1 | 1.1 |
| Molding density | g/cm³ | 0.4 | 0.4 |
| Charpy strength | kJ/m² | 10 | 8 |

C-1: core part/shell part = polybutadiene/methylmethacrylate,4-hydroxylbutylacrylate = 510/60/30

From results of Table 4, the curable resin composition of the present invention has a high impact resistance.

Example 9 and Comparative Example 11

According to the formulations shown in Table 5, a trifunctional polyether polyol PPT300 (A-1: Actcol T-300, manufactured by Mitsui Chemicals, Inc.) as the polyol component (A), a bifunctional polyether polyol PPG400 (A-3: Actcol D-400, manufactured by Mitsui Chemicals, Inc.) as the polyol component (A), a bifunctional polyether polyol PPG200 (A-4: SANNIX PP-200, manufactured by Sanyo Chemical Industries, Ltd.) as the polyol component (A), and the dispersant (M-1) obtained in Production Example 3-1 were mixed to prepare a mixed liquid. The mixed liquid was dried by injecting dry nitrogen thereto for 1 hour while heating to and maintaining at 60° C. Subsequently, the resulting mixed liquid was mixed well with a polymeric MDI (B-2: COSMONATE M-200, manufactured by Mitsui Chemicals, Inc.) as the polyisocyanate component (B) and defoamed to obtain a curable resin composition. It is to be noted that the ratio (β/α) of the total molar amount (β) of isocyanate groups of the polyisocyanate component (B) and the total molar amount (α) of hydroxyl groups of the polyol component (A) in the composition of Table 5 are all 1.1. This composition was poured into a form obtained by stacking 8 sheets of a carbon fiber fabric with 195 g/m², and heated at 100° C. for 3 hours to obtain a carbon fiber-reinforced molded body. The molded body obtained was cut into a test piece having a size of 50 mm in length and 5 mm in width. Then, a three-point bending test was carried out at a distance between support points of 30 mm and the deformation amount of until the test piece being broken was compared. If the deformation amount of the molded body is large, the molded body is difficult to break and is therefore superior. If the deformation amount was relatively large, the molded body was defined as "superior" and if the deformation amount was relatively small, the molded body was defined as "poor". The results are shown in Table 5.

TABLE 5

| Composition | | | Example 9 | Comparative Example 11 |
|---|---|---|---|---|
| Preparation containing polyol(A) | A-1 | Polyether polyol; three functional groups; hydroxyl value 530 mgKOH/g | 14.2 parts | 22.2 parts |
| | A-3 | Polyether polyol; two functional groups; hydroxyl value 570 mgKOH/g | 10.7 parts | 11.1 parts |
| | A-4 | Polyether polyol; two functional groups; hydroxyl value 270 mgKOH/g | 10.7 parts | 11.1 parts |
| | | Average hydroxyl value of polyol (A) mgKOH/g | 475 | 475 |
| Polyisocyanate(B) | B-2 | Polymethylenepolyphenylpolyisocyanate | 53.7 parts | 55.6 parts |
| Dispersion of polymer particles (C) | M-1 | Dispersion of polymer particles in which core-shell polymer C-1 is dispersed in polyol A-1 | 10.7 parts(3.57 parts of C-1 and 7.13 parts of A-1) | — |
| Amount of component (A) per total amount | | | 42.7 (%) | 44.4 (%) |
| Amount of component (B) per total amount | | | 53.7 (%) | 55.6 (%) |
| Amount of {component (A) + component (B)} per total amount | | | 96.4 (%) | 100.0 (%) |
| Amount of component (C) per total amount | | | 3.6 (%) | 0 (%) |
| Amount of component (B) per 100 parts of component (A) | | | 126 parts | 125 parts |
| Amount of component (C) to 100 parts per total amount of component (A) and component (B) | | | 3.7 parts | — |
| Amount of component (A) having three or more functional groups per 100 parts of total amount of component (A) | | | 50 parts | 50 parts |
| Ratio (β/α) of total molar amount (β) of isocyanate group of component (B) to total molar amount (α) of hydroxyl group of component (A) | | | 1.1 | 1.1 |
| Bending fracture resistance | | | excellent | poor |

C-1: core part/shell part = polybutadiene/methylmethacrylate, 4-hydroxylbutylacrylate = 510/60/30

From results of Table 5, a carbon fiber reinforced resin which is hardly cracked is obtained by using the curable resin composition of the present invention.

Example 10 and Comparative Examples 12 to 14

According to the formulations shown in Table 6, PPT300 (A-1) or PPG1000 (A-2) as the polyol component (A), the dispersants (M-1 to M-2) obtained in Production Examples 3-1 to 3-2, a polymeric MDI (B-2: COSMONATE M-200, manufactured by Mitsui Chemicals, Inc.) as the polyisocyanate component (B), an octylic acid salt of DBU (U-CAT SA102, manufactured by San-Apro Ltd.) as the curing catalyst component (D), a colloidal calcium carbonate (calcium carbonate CCR, manufactured by SHIRAISHI KOGYO KAISHA, LTD.), and a powdery synthetic zeolite A-3 (200 mesh passing material: manufactured by Wako Pure Chemical Industries, Ltd.) as a dehydrating agent were respectively weighed and mixed well to be defoamed to obtain a curable resin composition. It is to be noted that the ratio (β/α) of the total molar amount (β) of isocyanate groups of the polyisocyanate component (B) and the total molar amount (α) of hydroxyl groups of the polyol component (A) in the composition of Table 6 are all 1.1. According to the above test method, this composition was used to measure T-peel strength. The test results are shown in Table 6.

From result of Table 6, when a polyether polyol having a specified average hydroxyl value (a1), a polyisocyanate (B), and polymer fine particles (C) are combined, the curable resin composition of the present invention is excellent in adhesion because it exhibits a high T-peel strength.

Examples 11 to 17 and Comparative Examples 15 to 16

According to the formulations shown in Table 7, polyester polyol (A-6) or PPG1000 (A-2) of polyether polyol as the polyol component (A), the dispersants (M-2 and M-4 to 8) obtained in Production Examples 3-2 and 3-4 to 8, a polymeric MDI (B-2: COSMONATE M-200, manufactured by Mitsui Chemicals, Inc.) as the polyisocyanate component (B), humed silica (manufactured by CABOT, CAB-O-SIL TS-720), and a powdery synthetic zeolite A-3 (200 mesh passing material: manufactured by Wako Pure Chemical Industries, Ltd.) as a dehydrating agent were respectively weighed and defoamed by mixing well to obtain a curable resin composition. It is to be noted that the ratio (β/α) of the total molar amount (β) of isocyanate groups of the polyisocyanate component (B) and the total molar amount (α) of hydroxyl groups of the polyol component (A) in the composition of Table 7 are all 1.1. According to the above test method, this composition was used to measure T-peel strength and dynamic resistance to peel. The test results are shown in Table 7.

TABLE 6

| Composition | | | Example 10 | Comparative Example 12 | Comparative Example 13 | Comparative Example 14 |
|---|---|---|---|---|---|---|
| Preparation containing polyol(A) | A-1 | Polyether polyol; three functional groups; hydroxyl value 530 mgKOH/g | 5.1 parts | 29.3 parts | | |
| | A-2 | Polyether polyol; two functional groups; hydroxyl value 110 mgKOH/g | | | 54.3 parts | 26.5 parts |
| | | Average hydroxyl value of polyol (A) mgKOH/g | 530 | 530 | 110 | 110 |
| Polyisocyanate(B) | B-2 | Polymethylenepolyphenylpolyisocyanate | 34.8 parts | 40.6 parts | 15.6 parts | 13.4 parts |
| Dispersion of polymer particles (C) | M-1 | Dispersion of polymer particles in which core-shell polymer C-1 is dispersed in polyol A-1 | 30 parts(10 parts of C-1 and 20 parts of A-1) | | | |
| | M-2 | Dispersion of polymer particles in which core-shell polymer C-1 is dispersed in polyol A-2 | | | | 30 parts(10 parts of C-1 and 20 parts of A-2) |
| Curing catalyst (D) | | 1,8-Diazabicyclo[5.4.0]undec-7-ene 2-ethylhexanoate | 0.1 parts | 0.1 parts | 0.1 parts | 0.1 parts |
| Dehydrating agent (E) | | Synthetic zeoliteA-3 | 10 parts | 10 parts | 10 parts | 10 parts |
| Filler | | Colloidal calcium carbonate | 20 parts | 20 parts | 20 parts | 20 parts |
| Amount of component (A) per total amount | | | 25.1 (%) | 29.3 (%) | 54.3 (%) | 46.5 (%) |
| Amount of component (B) per total amount | | | 34.8 (%) | 40.6 (%) | 15.6 (%) | 13.4 (%) |
| Amount of {component (A) + component (B)} per total amount | | | 59.9 (%) | 69.9 (%) | 69.9 (%) | 59.9 (%) |
| Amount of component (C) per total amount | | | 10.0 (%) | 0 (%) | 0 (%) | 10.0 (%) |
| Amount of component (B) per 100 parts of component (A) | | | 139 parts | 139 parts | 29 parts | 29 parts |
| Amount of component (C) per 100 parts of total amount of component (A) and component (B) | | | 16.7 parts | — | — | 16.7 parts |
| Amount of component (D) per 100 parts of total amount of component (A) and component (B) | | | 0.17 parts | 0.14 parts | 0.14 parts | 0.17 parts |
| Amount of component (E) per 100 parts of total amount of component (A) and component (B) | | | 17 parts | 14 parts | 14 parts | 17 parts |
| Amount of component (A) having three or more functional groups per 100 parts of total amount of component (A) | | | 100 parts | 100 parts | 0 parts | 0 parts |
| Ratio (β/α) of total molar amount (β) of isocyanate group of component (B) to total molar amount (α) of hydroxyl group of component (A) | | | 1.1 | 1.1 | 1.1 | 1.1 |
| T-peel strength | | kN/m | 1.28 | 0.19 | 0.34 | 0.34 |

C-1: core part/shell part = polybutadiene/methylmethacrylate, 4-hydroxylbutylacrylate = 510/60/30

TABLE 7

| | | Composition | Example 11 | Example 12 | Example 13 | Example 14 | Example 15 |
|---|---|---|---|---|---|---|---|
| Preparation containing polyol(A) | A-6 | Polyester polyol; two functional groups; hydroxyl value 173 mgKOH/g | 40.6 parts | 40.6 parts | 40.6 parts | 40.6 parts | 40.6 parts |
| | A-2 | Polyether polyol; two functional groups; hydroxyl value 110 mgKOH/g | | | | | |
| | | Average hydroxyl value of polyol (A) mgKOH/g | 173 | 173 | 173 | 173 | 173 |
| Polyisocyanate(B) | B-2 | Polymethylenepolyphenylpolyisocyanate | 27.4 parts | 27.4 parts | 27.4 parts | 27.4 parts | 27.4 parts |
| Dispersion of polymer particles (C) | M-4 | Dispersion of polymer particles in which core-shell polymer C-2 is dispersed in polyol A-6 | 30 parts(10 parts of C-2 and 20 parts of A-6) | | | | |
| | M-5 | Dispersion of polymer particles in which core-shell polymer C-3 is dispersed in polyol A-6 | | 30 parts(10 parts of C-3 and 20 parts of A-6) | | | |
| | M-6 | Dispersion of polymer particles in which core-shell polymer C-4 is dispersed in polyol A-6 | | | 30 parts(10 parts of C-4 and 20 parts of A-6) | | |
| | M-7 | Dispersion of polymer particles in which core-shell polymer C-5 is dispersed in polyol A-6 | | | | 30 parts(10 parts of C-5 and 20 parts of A-6) | |
| | M-8 | Dispersion of polymer particles in which core-shell polymer C-6 is dispersed in polyol A-6 | | | | | 30 parts(10 parts of C-6 and 20 parts of A-6) |
| | M-2 | Dispersion of polymer particles in which core-shell polymer C-1 is dispersed in polyol A-2 | | | | | |
| Dehydrating agent (E) | | Synthetic zeoliteA-3 | 10 parts | 10 parts | 10 parts | 10 parts | 10 parts |
| Filler | | Humed silica | 2 parts | 2 parts | 2 parts | 2 parts | 2 parts |
| | | Amount of component (A) per total amount | 55.1 (%) | 55.1 (%) | 55.1 (%) | 55.1 (%) | 55.1 (%) |
| | | Amount of component (B) per total amount | 24.9 (%) | 24.9 (%) | 24.9 (%) | 24.9 (%) | 24.9 (%) |
| | | Amount of {component (A) + component (B)} per total amount | 80.0 (%) | 80.0 (%) | 80.0 (%) | 80.0 (%) | 80.0 (%) |
| | | Amount of component (C) per total amount | 9.1 (%) | 9.1 (%) | 9.1 (%) | 9.1 (%) | 9.1 (%) |
| | | Amount of component (B) per 100 parts of component (A) | 45 parts | 45 parts | 45 parts | 45 parts | 45 parts |
| | | Amount of component (C) per 100 parts of total amount of component (A) and component (B) | 11.4 parts | 11.4 parts | 11.4 parts | 11.4 parts | 11.4 parts |
| | | Amount of polyesterpolyol per 100 parts of total amount of component (A) | 100 parts | 100 parts | 100 parts | 100 parts | 100 parts |
| | | Amount of component (E) per 100 parts of total amount of component (A) and component (B) | 11.4 parts | 11.4 parts | 11.4 parts | 11.4 parts | 11.4 parts |
| | | Amount of component (A) having three or more functional groups per 100 parts of total amount of component (A) | 0 parts | 0 parts | 0 parts | 0 parts | 0 parts |
| | | Ratio(β/α) of total molar amount (β) of isocyanate group of component (B) to total molar amount (α) of hydroxyl group of component (A) | 1.1 | 1.1 | 1.1 | 1.1 | 1.1 |
| T- peel strength | | kN/m | 6.4 | 6.1 | 7.0 | 8.4 | 8.7 |
| Dynamic resistance to cleverage | | kN/m | 26 | 25 | 25 | 23 | 20 |

| | | Composition | Example 16 | Example 17 | Comparative Example 15 | Comparative Example 16 |
|---|---|---|---|---|---|---|
| Preparation containing polyol(A) | A-6 | Polyester polyol; two functional groups; hydroxyl value 173 mgKOH/g | 40.6 parts | 20.6 parts | 60.6 parts | |
| | A-2 | Polyether polyol; two functional groups; hydroxyl value 110 mgKOH/g | | 20 parts | | 48.2 parts |
| | | Average hydroxyl value of polyol (A) mgKOH/g | 152 | 131 | 173 | 110 |
| Polyisocyanate(B) | B-2 | Polymethylenepolyphenylpolyisocyanate | 24.1 parts | 20.8 parts | 27.4 parts | 19.8 parts |
| Dispersion of polymer particles (C) | M-4 | Dispersion of polymer particles in which core-shell polymer C-2 is dispersed in polyol A-6 | | | | |
| | M-5 | Dispersion of polymer particles in which core-shell polymer C-3 is dispersed in polyol A-6 | | | | |
| | M-6 | Dispersion of polymer particles in which core-shell polymer C-4 is dispersed in polyol A-6 | | | | |
| | M-7 | Dispersion of polymer particles in which core-shell polymer C-5 is dispersed in polyol A-6 | | | | |
| | M-8 | Dispersion of polymer particles in which core-shell polymer C-6 is dispersed in polyol A-6 | | | | |

TABLE 7-continued

| | | | | | | |
|---|---|---|---|---|---|---|
| | M-2 | Dispersion of polymer particles in which core-shell polymer C-1 is dispersed in polyol A-2 | 30 parts(10 parts of C-1 and 20 parts of A-2) | 30 parts(10 parts of C-1 and 20 parts of A-2) | | 30 parts(10 parts of C-1 and 20 parts of A-2) |
| Dehydrating agent (E) | | Synthetic zeolite A-3 | 10 parts | 10 parts | 10 parts | 10 parts |
| Filler | | Humed silica | 2 parts | 2 parts | 2 parts | 2 parts |
| | Amount of component (A) per total amount | | 56.8 (%) | 58.6 (%) | 60.6 (%) | 62.0 (%) |
| | Amount of component (B) per total amount | | 22.6 (%) | 20.1 (%) | 27.4 (%) | 18.0 (%) |
| Amount of {component (A) + component (B)} per total amount | | | 79.4 (%) | 78.7 (%) | 88.0 (%) | 80.0 (%) |
| Amount of component (C) per total amount | | | 9.4 (%) | 9.7 (%) | 0 (%) | 9.1 (%) |
| Amount of component (B) per 100 parts of component (A) | | | 40 parts | 34 parts | 45 parts | 29 parts |
| Amount of component (C) per 100 parts of total amount of component (A) and component (B) | | | 11.8 parts | 12.3 parts | — | 11.4 parts |
| Amount of polyesterpolyol per 100 parts of total amount of component (A) | | | 67 parts | 34 parts | 100 parts | 0 parts |
| Amount of component (E) per 100 parts of total amount of component (A) and component (B) | | | 11.8 parts | 12.3 parts | 11.4 parts | 11.4 parts |
| Amount of component (A) having three or more functional groups per 100 parts of total amount of component (A) | | | 0 parts | 0 parts | 0 parts | 0 parts |
| Ratio(β/α) of total molar amount (β) of isocyanate group of component (B) to total molar amount (α) of hydroxyl group of component (A) | | | 1.1 | 1.1 | 1.1 | 1.1 |
| T- peel strength | | kN/m | 5.7 | 4.3 | 4.0 | 0.5 |
| Dynamic resistance to cleverage | | kN/m | 12 | 6 | 3 | 0 |

C-1: core part/shell part = polybutadiene/methylmethacrylate, 4-hydroxylbutylacrylate = 510/60/30
C-2: core part/shell part = polybutadiene/methylmethacrylate, styrene = 80/18/2
C-3: core part/shell part = polybutadiene/methylmethacrylate, styrene, 4-hydroxylbutylacrylate = 80/17.5/2/0.5
C-4: core part/shell part = polybutadiene/methylmethacrylate, styrene, 4-hydroxylbutylacrylate = 80/17/2/1
C-5: core part/shell part = polybutadiene/methylmethacrylate, styrene, 4-hydroxylbutylacrylate = 80/16/2/2
C-6: core part/shell part = polybutadiene/methylmethacrylate, styrene, 4-hydroxylbutylacrylate = 80/14/2/4
C-2 to C-6 contain intermediate parts composed of polybutadiene From results of Table 7, when a polyester polyol (a2), a polyisocyanate (B), and polymer fine particles (C) are combined, the curable resin composition of the present invention is excellent in adhesion because it exhibits high T-peel strength and high dynamic resistance to peel.

Example 18

The curable resin composition of Example 1 was applied on a mortar plate to a thickness of 100 μm. This was cured at 80° C. for 3 hours to obtain a laminate. The coating film of the resulting laminate was a strong coating film against shock. The coating film of the laminate was allowed to stand at an outdoor sunny place for one year, so that yellowing of the coating film was observed.

Example 19

The curable resin composition of Example 1 was applied on a mortar plate to a thickness of 100 μm in the same manner as in Example 18, except for using a curable resin composition wherein 1 part by mass of the octylic acid salt of DBU (U-CAT SA102, manufactured by San-Apro Ltd.) as the curing catalyst component (D) was changed to 0.01 parts by mass of dibutyltin dilaurate. This was cured at 80° C. for 3 hours to obtain a laminate. The coating film of the resulting laminate was a strong coating film against shock. Furthermore, although the coating film of the laminate was allowed to stand for one year at an outdoor sunny place, yellowing of the coating film was not observed.

Example 20

A glass fiber-reinforced composite material was prepared using the curable resin composition of Example 1 according to Example of Japanese Unexamined Patent Application Publication No 2002-530445. The resulting composite material showed a high toughness.

The invention claimed is:

1. A curable resin composition comprising a polyol (A), a polyisocyanate (B), and polymer fine particles (C), wherein the polyol (A) comprises a polyester polyol (a2) as an essential component, and the amount of the polyester polyol (a2) is not less than 20 parts by mass per 100 parts by mass of the polyol (A),
   the polymer fine particles (C) have a core-shell structure,
      the polymer fine particles (C) have one or more core layers selected from the group consisting of a diene rubber, a (meth)acrylate rubber, and an organosiloxane rubber,
   the polymer fine particles (C) have a shell layer graft-polymerized on the core layer,
   the shell layer is polymerized with one or more monomers selected from the group consisting of an aromatic vinyl monomer, a vinyl cyanide monomer, and a (meth)acrylate monomer, and
   the polyol (A) has an average hydroxyl value of 130 to 1000 mg KOH/g.

2. The curable resin composition according to claim 1, wherein the shell layer is further polymerized with a monomer having a hydroxyl group.

3. The curable resin composition according to claim 2, wherein the monomer having a hydroxyl group comprises a hydroxyl linear alkyl (meth)acrylate, a caprolacton-modified hydroxyl (meth)acrylate, a hydroxyl branched alkyl (meth)acrylate, or a mono(meth)acrylate of polyesterdiol.

4. The curable resin composition according to claim 2, wherein the content of the monomer having a hydroxyl group is not less than 1% by mass and not more than 60% by mass per a total monomer used in the formation of the shell layer.

5. The curable resin composition according to claim 3, wherein the content of the monomer having a hydroxyl group is not less than 1% by mass and not more than 60% by mass per a total monomer used in the formation of the shell layer.

6. The curable resin composition according to claim 1, wherein a dispersion of which the polymer fine particles (C) are dispersed in a part of the polyol (A) is added to the curable resin composition.

7. The curable resin composition according to claim 2, wherein a dispersion of which the polymer fine particles (C) are dispersed in a part of the polyol (A) is added to the curable resin composition.

8. The curable resin composition according to claim 1, wherein the polymer fine particles (C) are dispersed in a state of primary particles in the curable resin composition.

9. The curable resin composition according to claim 2, wherein the polymer fine particles (C) are dispersed in a state of primary particles in the curable resin composition.

10. The curable resin composition according to claim 1, further comprising a curing catalyst (D).

11. A cured product obtained by curing the curable resin composition according to claim 1.

12. A structural adhesive containing the curable resin composition according to claim 1.

13. A coating material containing the curable resin composition according to claim 1.

14. A curable resin composition comprising a polyol (A), a polyisocyanate (B), and polymer fine particles (C), wherein the polyol (A) comprises a polyester polyol (a2) as an essential component, and the amount of the polyester polyol (a2) is not less than 20 parts by mass per 100 parts by mass of the polyol (A),
the polymer fine particles (C) have a core-shell structure,
the polymer fine particles (C) have one or more core layers selected from the group consisting of a diene rubber, a (meth)acrylate rubber, and an organosiloxane rubber,
the polymer fine particles (C) have a shell layer graft-polymerized on the core layer,
the shell layer is polymerized with one or more monomers selected from the group consisting of an aromatic vinyl monomer, a vinyl cyanide monomer, and a (meth) acrylate monomer,
the shell layer is further polymerized with a monomer having a hydroxyl group,
the polyol (A) has the average hydroxyl value of 130 to 1000 mg KOH/g, and
the content of the monomer having a hydroxyl group is not less than 1% by mass and not more than 60% by mass per a total monomer used in the formation of the shell layer.

\* \* \* \* \*